(12) United States Patent
Ono et al.

(10) Patent No.: US 12,123,069 B2
(45) Date of Patent: Oct. 22, 2024

(54) STEEL SHEET AND METHOD FOR PRODUCING THE SAME

(71) Applicant: JFE STEEL CORPORATION, Tokyo (JP)

(72) Inventors: Yoshihiko Ono, Tokyo (JP); Junya Tobata, Tokyo (JP); Hiroyuki Akimoto, Tokyo (JP); Yoichiro Matsui, Tokyo (JP); Shinjiro Kaneko, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 693 days.

(21) Appl. No.: 17/286,148

(22) PCT Filed: Oct. 16, 2019

(86) PCT No.: PCT/JP2019/040663
§ 371 (c)(1),
(2) Date: Apr. 16, 2021

(87) PCT Pub. No.: WO2020/080402
PCT Pub. Date: Apr. 23, 2020

(65) Prior Publication Data
US 2021/0355559 A1  Nov. 18, 2021

(30) Foreign Application Priority Data

Oct. 17, 2018 (JP) .................................. 2018-196150
Sep. 11, 2019 (JP) .................................. 2019-165438

(51) Int. Cl.
*C21D 9/46* (2006.01)
*C21D 1/20* (2006.01)
(Continued)

(52) U.S. Cl.
CPC ................. *C21D 9/46* (2013.01); *C21D 1/20* (2013.01); *C21D 6/004* (2013.01); *C21D 6/005* (2013.01);
(Continued)

(58) Field of Classification Search
CPC .............. C21D 1/19; C21D 1/20; C21D 1/22; C21D 1/25; C21D 1/28; C21D 2211/002;
(Continued)

(56) References Cited

U.S. PATENT DOCUMENTS

2011/0146852 A1* 6/2011 Matsuda ................. C22C 38/04
148/333

FOREIGN PATENT DOCUMENTS

CN 102712980 A 10/2012
CN 104471093 A 3/2015
(Continued)

OTHER PUBLICATIONS

ASM Handbook. vol. 13A. Corrosion: Fundamentals, Testing, and Protection. "Batch process hot dip galvanizing". 2003. p. 794-802 (Year: 2003).*
(Continued)

Primary Examiner — Nicholas A Wang
(74) Attorney, Agent, or Firm — Oliff PLC

(57) ABSTRACT

A steel sheet having a specified chemical composition and a method for producing the steel sheet. The steel sheet has a microstructure comprising ferrite: 5% or less, and at least one of upper bainite, fresh martensite, tempered martensite, lower bainite, and retained γ: 95% to 100% by area percentage, and retained γ: 4% to 15% by volume percentage. Retained $\gamma_{UB}$ has a specified area percentage $S_{\gamma UB}$, retained $\gamma_{LB}$ has a specified distribution number $N_{\gamma LB}$, and at least one of (i) fresh martensite has a specified equivalent circular grain diameter and aspect ratio and (ii) retained γ grains has
(Continued)

1 μm a; UPPER BAINITE (WITH LITTLE CARBIDE)
b; PLATE-LIKE RETAINED $\gamma_{UB}$ FORMED ADJACENT TO UPPER BAINITE
  (RETAINED $\gamma_{UB}$: RETAINED γ WITH A GRAIN WIDTH IN THE RANGE OF 0.25 TO 0.60 μm,
  A GRAIN LENGTH IN THE RANGE OF 1.0 TO 15 μm, AND AN ASPECT RATIO IN THE RANGE OF 3.1 TO 25)
c; TEMPERED MARTENSITE
d; LOWER BAINITE
e; FILM-LIKE RETAINED $\gamma_{LB}$ FORMED ADJACENT TO LOWER BAINITE OR TEMPERED MARTENSITE
  (RETAINED γ WITH A GRAIN WIDTH IN THE RANGE OF 0.08 TO 0.24 μm,
  A GRAIN LENGTH IN THE RANGE OF 0.6 TO 15 μm, AND AN ASPECT RATIO IN THE RANGE OF 4 TO 40)
f; FRESH MARTENSITE OR RETAINED γ GRAINS WITH AN EQUIVALENT CIRCULAR GRAIN DIAMETER
  IN THE RANGE OF 0.4 TO 1.0 μm AND AN ASPECT RATIO OF 3 OR LESS
g; POLYGONAL FERRITE a specified equivalent circular grain diameter and aspect ratio.

20 Claims, 3 Drawing Sheets

(51) Int. Cl.
   *C21D 6/00* (2006.01)
   *C21D 8/02* (2006.01)
   *C22C 38/00* (2006.01)
   *C22C 38/02* (2006.01)
   *C22C 38/04* (2006.01)
   *C22C 38/06* (2006.01)
   *C22C 38/12* (2006.01)
   *C22C 38/14* (2006.01)
   *C22C 38/42* (2006.01)
   *C22C 38/44* (2006.01)
   *C22C 38/50* (2006.01)
   *C22C 38/54* (2006.01)
   *C22C 38/58* (2006.01)
   *C22C 38/60* (2006.01)

(52) U.S. Cl.
   CPC .......... *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/42* (2013.01); *C22C 38/44* (2013.01); *C22C 38/50* (2013.01); *C22C 38/54* (2013.01); *C22C 38/58* (2013.01); *C22C 38/60* (2013.01); *C21D 2211/002* (2013.01); *C21D 2211/005* (2013.01); *C21D 2211/008* (2013.01)

(58) Field of Classification Search
   CPC ........ C21D 2211/005; C21D 2211/008; C21D 6/001; C21D 6/002; C21D 6/005; C21D 6/008; C21D 8/0205; C21D 8/0226; C21D 8/0236; C21D 8/0263; C21D 8/0473; C21D 9/46; C21D 9/48; C21D 6/004; C21D 8/0273
   See application file for complete search history.

(56) References Cited

FOREIGN PATENT DOCUMENTS

| | | | |
|---|---|---|---|
| CN | 106164313 | A | 11/2016 |
| CN | 107075627 | A | 8/2017 |
| CN | 107849652 | A | 3/2018 |
| CN | 108603269 | A | 9/2018 |
| EP | 2 530 179 | A1 | 12/2012 |
| EP | 2546368 | A1 | 1/2013 |
| EP | 2 873 746 | A1 | 5/2015 |
| EP | 3 128 023 | A1 | 2/2017 |
| EP | 3 178 956 | A1 | 6/2017 |
| EP | 3 330 395 | A1 | 6/2018 |
| EP | 3 415 653 | A1 | 12/2018 |
| EP | 3438309 | A1 | 2/2019 |
| EP | 3476963 | A1 | 5/2019 |
| JP | H06-35619 | A | 2/1994 |
| JP | 3854506 | B2 | 12/2006 |
| JP | 3881559 | B2 | 2/2007 |
| JP | 4411221 | B2 | 2/2010 |
| JP | 2013-72101 | A | 4/2013 |
| JP | 5463685 | B2 | 4/2014 |
| JP | 2017186647 | A | 10/2017 |
| JP | 2017214648 | | * 12/2017 |
| JP | 2017214648 | A | 12/2017 |
| WO | 2010/029983 | A1 | 3/2010 |
| WO | 2017/208759 | A1 | 12/2017 |
| WO | 2018043456 | A1 | 3/2018 |
| WO | 2018/190416 | A1 | 10/2018 |

OTHER PUBLICATIONS

May 12, 2022 Office Action issued in Chinese Patent Application No. 201980068746.7.
Jan. 17, 2023 Written Decision on Registration issued in Korean Patent Application No. 10-2021-7011106.
Mar. 1, 2023 Office Action issued in European Patent Application No. 19 873 398.2.
Jan. 21, 2020 International Search Report issued in International Application No. PCT/JP2019/040663.
Jun. 14, 2021 Extended European Search Report issued in European Patent Application No. 19873398.2.
Jan. 31, 2024 Office Action issued in U.S. Appl. No. 17/285,375.

* cited by examiner

FIG. 1

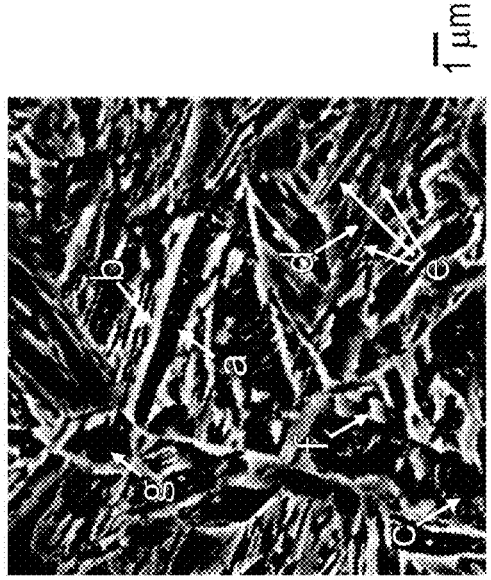

a; UPPER BAINITE (WITH LITTLE CARBIDE)
b; PLATE-LIKE RETAINED $\gamma_{UB}$ FORMED ADJACENT TO UPPER BAINITE (RETAINED $\gamma_{UB}$: RETAINED $\gamma$ WITH A GRAIN WIDTH IN THE RANGE OF 0.25 TO 0.60 μm, A GRAIN LENGTH IN THE RANGE OF 1.0 TO 15 μm, AND AN ASPECT RATIO IN THE RANGE OF 3.1 TO 25)
c; TEMPERED MARTENSITE
d; LOWER BAINITE
e; FILM-LIKE RETAINED $\gamma_{LB}$ FORMED ADJACENT TO LOWER BAINITE OR TEMPERED MARTENSITE (RETAINED $\gamma$ WITH A GRAIN WIDTH IN THE RANGE OF 0.08 TO 0.24 μm, A GRAIN LENGTH IN THE RANGE OF 0.6 TO 15 μm, AND AN ASPECT RATIO IN THE RANGE OF 4 TO 40)
f; FRESH MARTENSITE OR RETAINED $\gamma$ GRAINS WITH AN EQUIVALENT CIRCULAR GRAIN DIAMETER IN THE RANGE OF 0.4 TO 1.0 μm AND AN ASPECT RATIO OF 3 OR LESS
g; POLYGONAL FERRITE

STEEL SHEET AND METHOD FOR PRODUCING THE SAME

TECHNICAL FIELD

This application relates to a steel sheet and a method for producing the steel sheet, which can be preferably applied to press forming used through a press forming process in automobiles, household electrical appliances, and the like.

BACKGROUND

In recent years, with further increasing needs for weight reduction of automobile bodies, the application of 980 to 1180 MPa grade high-strength steel sheets to automobile frame components and seat components has been progressing. When 980 to 1180 MPa grade high-strength steel sheets are applied to automobile components, however, cracking in a pressing process tends to occur due to a decrease in ductility or stretch-flangeability. Thus, it is desirable that these high-strength steel sheets have higher formability than conventional steel sheets.

Against such a background, TRIP steel containing retained γ dispersed in the microstructure of steel sheets has been developed as a technique for improving the ductility of the steel sheets.

For example, Patent Literature 1 discloses that ductile steel sheets with a tensile strength (TS) of 80 kgf/mm$^2$ or more and TS×El≥2500 kgf/mm$^{2}$·% can be produced by annealing steel containing C: 0.10% to 0.45%, S: 0.5% to 1.8%, and Mn: 0.5% to 3.0% and holding the steel in the range of 350° C. to 500° C. for 1 to 30 minutes to form retained γ.

Patent Literature 2 discloses that steel sheets with high ductility El and stretch-flangeability λ can be produced by annealing steel containing C: 0.10% to 0.25%, Si: 1.0% to 2.0%, and Mn: 1.5% to 3.0%, cooling the steel to a temperature in the range of 450° C. to 300° C. at 10° C./s or more, and holding the steel for 180 to 600 seconds such that controlling retained austenite to 5% by area percentage or more, bainitic ferrite to 60% by area percentage or more, and polygonal ferrite to 20% by area percentage or less.

Patent Literature 3 discloses that a steel sheet can be provided with high ductility and stretch-flangeability by annealing a steel sheet with a specific composition, cooling the steel sheet to a temperature in the range of 150° C. to 350° C., and then reheating and holding the steel sheet at approximately 400° C. to form a microstructure containing ferrite, tempered martensite, and retained austenite. This utilizes the principle of Quenching & Partitioning (Q & P, quenching and partitioning of carbon from martensite to austenite), which includes in a cooling process once cooling to a temperature range between a martensite transformation start temperature (Ms point) and a martensite transformation finish temperature (Mf point) and then reheating and holding to stabilize retained γ. In recent years, this principle has been utilized to develop high-strength steels with high ductility and stretch-flangeability.

Patent Literature 4 discloses an improved method of the Q & P treatment. More specifically, it aims to achieve high ductility and stretch-flangeability by annealing steel with a specific composition at a temperature of Ae3—10° C. or more to decrease polygonal ferrite to 5% or less and then stopping cooling at a relatively high temperature in the range of Ms—10° C. to Ms—100° C. to form upper bainite when reheated to approximately 400° C.

Patent Literature 5 discloses a method of utilizing bainite formed at low temperatures and bainite formed at high temperatures to produce a steel sheet with high ductility and low-temperature toughness. More specifically, a steel sheet with high ductility and low-temperature toughness is produced by annealing steel containing C: 0.10% to 0.5%, cooling the steel to a temperature in the range of 150° C. to 400° C. at a cooling rate of 10° C./s or more, holding the steel in this temperature range for 10 to 200 seconds to form low-temperature bainite, reheating the steel to the temperature range of more than 400° C. and 540° C. or less, and holding the steel for 50 seconds or more to form high-temperature bainite.

CITATION LIST

Patent Literature

PTL 1: Japanese Examined Patent Application Publication No. 6-35619
PTL 2: Japanese Patent No. 4411221
PTL 3: Japanese Patent No. 5463685
PTL 4: Japanese Patent No. 3881559
PTL 5: Japanese Patent No. 3854506

SUMMARY

Technical Problem

However, known TRIP steel described in Patent Literature 1 has very low stretch-flangeability, though it has high El.

The technique described in Patent Literature 2 mainly utilizes bainitic ferrite as a microstructure, and the amount of ferrite is small. Thus, the stretch-flangeability is good, but the ductility is not necessarily high. Thus, its application to difficult-to-form components requires further improvement in ductility.

The technique described in Patent Literature 3 achieves relatively higher ductility and stretch-flangeability than known TRIP steel and steel containing bainitic ferrite. However, breakage was observed in the forming of difficult-to-form components, such as center pillars, and further improvement in ductility has been required. Among ductilities, local ductility (L. El), which is a measure of ductility in local deformation on a flange end face or the like, tends to deteriorate in known TRIP steel, and it is necessary to improve it.

The technique described in Patent Literature 4 decreases the amount of polygonal ferrite formed to decrease the amount of massive martensite and cannot therefore ensure sufficient ductility. The technique also sets a relatively high cooling stop temperature to improve El and leaves a large amount of untransformed γ when cooling is stopped. Thus, massive martensite tends to remain.

Although the technique described in Patent Literature 5 utilizes low-temperature transformed bainite and high-temperature transformed bainite to improve ductility, low-temperature transformed bainite contributes little to improvement in ductility, and the use of bainite formed at high temperatures tends to leave a massive microstructure. Thus, it is difficult to simultaneously achieve high ductility and high stretch-flangeability.

Thus, steel sheets with sufficiently high ductility and stretch-flangeability have not been produced in the related art.

The disclosed embodiments have been made to solve such problems and aims to provide a steel sheet with very high ductility and high stretch-flangeability even with a tensile strength on the level of 780 to 1450 MPa and provide a method for producing the steel sheet.

Steel sheets, as used herein, include galvanized steel sheets which are subjected to galvanization to the surface.

Solution to Problem

The present inventors have extensively studied a means for providing very high ductility and high stretch-flangeability and have obtained the following conclusions.

First, the present inventors examined the causes of (1) insufficient stretch-flangeability of austempered TRIP steel and (2) insufficient ductility of steel that utilized Q & P. The possible cause of (1) is described below. In austempered TRIP steel, carbon diffuses from bainite to untransformed austenite while austempering at approximately 400° C., and bainite transformation is retarded when the amount of carbon in austenite approaches the $T_0$ composition in which the free energies of a bcc phase and an fcc phase become equal. The retardation of transformation leaves a massive microstructure composed of hard martensite in which carbon is concentrated only near the $T_0$ composition and retained γ. The possible cause of (2) is described below. In steel that utilized Q & P, although the cooling stop temperature can be sufficiently lowered to decrease the amount of massive microstructure, precipitation of carbide or stabilization of carbon in martensite prevents carbon from being supplied to an austenite phase and prevents retained γ to be sufficiently stabilized.

The phenomenon (1) is also inevitable when a large amount of upper bainite is to be generated in the final tempering process of the Q & P process. More specifically, it is difficult in a previously proposed heat treatment method to achieve both the utilization of stable retained γ formed adjacent to upper bainite transformation and the decrease in the amount of massive microstructure. Thus, it is difficult in the related art to get out of certain ranges of ductility and stretch-flangeability.

On the other hand, the present inventors have found a new heat treatment technique that can impart characteristics beyond the characteristic range of the above techniques by achieving both the utilization of stable retained γ formed adjacent to upper bainite and the decrease in the amount of massive microstructure. It relies on the following.

(i) In a cooling process after annealing, high-temperature bainite is formed by holding the transformation nose of upper bainite at approximately 450° C. (405° C. to 490° C.) for 10 to 200 seconds with little carbide precipitation. Such intermediate holding in the high temperature region forms plate-like (rod-like in the cross-sectional microstructure) retained $γ_{UB}$, which contributes to improved ductility in the final microstructure, and bainite with less strain adjacent to the plate-like retained $γ_{UB}$. The bainite is indispensable to carbon supply to the plate-like retained $γ_{UB}$.

(ii) In a remaining untransformed γ region, secondary cooling is started before carbon concentration reaches to the $T_0$ composition, which can cause the formation of a massive microstructure, and the rapid cooling is performed to 310° C. at a cooling rate of 10° C./s or more.

(iii) The cooling is continuously performed from 310° C. to a cooling stop temperature of 220° C. or more and less than 255° C. to divide the remaining untransformed γ region by martensite transformation or lower bainite transformation to decrease the amount of massive microstructure.

(iv) In this cooling process, second holding is performed after slow cooling of less than 20° C./s in the low-temperature range of 310° C. to 255° C., thereby forming lower bainite to extremely finely divide remaining γ and simultaneously causing carbon partitioning to form a film-like retained $γ_{LB}$ (acicular in the cross-sectional microstructure) that contributes to improved ductility, particularly improved local ductility.

(v) The cooling stop temperature is set to 220° C. or more and less than 255° C. (220° C. to 254° C.) to disperse fine martensite or retained γ with an equivalent circular diameter in the range of 0.4 to 1.0 μm, which reduces a decrease in λ or local ductility and contributes to improved ductility. Furthermore, massive martensite or γ that greatly impairs local ductility is decreased.

(vi) Subsequently, the two types of retained γ, that is, the plate-like retained $γ_{UB}$ adjacent to the upper bainite formed by the holding while cooling and the film-like retained $γ_{LB}$ remaining adjacent to martensite or lower bainite formed during the secondary cooling are stabilized by reheating and holding at approximately 400° C. to convert martensite to tempered martensite and simultaneously by carbon partitioning in the plate-like retained $γ_{UB}$ and the film-like retained $γ_{LB}$.

(vii) In the case of composite forming that includes stretch forming and stretch flange forming in one component, increasing the bead tension in pressing suppresses the inflow of a steel sheet and tends to induce cracking in a stretch-formed portion, and decreasing the bead tension increases the inflow of a steel sheet and tends to induce cracking in a flange portion. To prevent each cracking, the forming stability of a component that even requires strict forming on a flange end face is significantly improved by satisfying TS×El≥17000 MPa %, preferably TS×El≥18000 MPa %, more preferably TS×El≥19000 MPa %, wherein El is a measure of ductility, and ensuring λ≥50% or more, preferably λ≥55% or more, for TS: 780 to 1319 MPa, or λ≥40% or more, preferably λ≥45% or more, for TS: 1320 to 1450 MPa, wherein λ is a measure of stretch-flangeability.

Thus, the utilization of stable retained γ and the decrease in the amount of massive microstructure, which have been difficult before, can be achieved at the same time by a two-step cooling process, which utilizes upper bainite transformation before martensite transformation and controls the residual amount of remaining massive microstructure through the Q & P process, and by slow cooling for carbon partitioning in a middle range of 310° C. to 255° C. Consequently, a steel sheet with very high ductility and stretch-flangeability can be obtained. The disclosed embodiments can also achieve reinforcement. The phrase "with very high ductility and stretch-flangeability", as used herein, refers to TS×El≥17000 MPa %, λ≥50% or more for the TS: 780 to 1319 MPa, and λ≥40% or more for the TS: 1320 to 1450 MPa. The term "higher strength", as used herein, refers to TS≥780 MPa.

The disclosed embodiments are based on such findings and more specifically provides the following.

[1] A steel sheet with a composition containing, on a mass percent basis: C: 0.06% to 0.25%, Si: 0.6% to 2.5%, Mn: 2.3% to 3.5%, P: 0.02% or less, S: 0.01% or less, sol. Al: less than 0.50%, N: less than 0.015%, and a remainder composed of iron and incidental impurities, wherein a steel microstructure contains ferrite: 5% by area percentage or less, a microstructure composed of one or two or more of upper bainite, fresh martensite, tempered martensite, lower bainite, and retained γ: 95% to 100% by area percentage, and retained γ: 4% to 15% by volume percentage, retained $γ_{UB}$ with a grain width in the range of 0.25 to 0.60 μm, a grain length in the range of 1.0 to 15 μm, and an aspect ratio in the range of 3.1 to 25 has an area percentage $S_{\gamma UB}$ in the range of 0.2% to 7.0%, retained $\gamma_{LB}$ with a grain width in the range of 0.08 to 0.24 µm, a grain length in the range of 0.6 to 15 µm, and an aspect ratio in the range of 4 to 40 has a distribution number $N_{\gamma LB}$ in the range of 10 to 120 per 100 µm² fresh martensite with an equivalent circular grain diameter in the range of 0.4 to 1.0 µm and an aspect ratio of 3 or less and/or retained γ grains with an equivalent circular grain diameter in the range of 0.4 to 1.0 µm and an aspect ratio of 3 or less have a total area percentage $S_{\gamma Fine}$ in the range of 0.4% to 5.0%, and fresh martensite with an equivalent circular grain diameter in the range of 1.2 to 20 µm and an aspect ratio of 3 or less and/or retained γ grains with an equivalent circular grain diameter in the range of 1.2 to 20 µm and an aspect ratio of 3 or less have a total area percentage $S_{\gamma Block}$ in the range of 4% or less (including 0%).

[2] A steel sheet with a composition containing, on a mass percent basis: C: 0.06% to 0.25%, Si: 0.6% to 2.5%, Mn: 2.3% to 3.5%, P: 0.02% or less, S: 0.01% or less, sol. Al: less than 0.50%, N: less than 0.015%, and a remainder composed of iron and incidental impurities, wherein a steel microstructure contains ferrite: 5% by area percentage or less, a microstructure composed of one or two or more of upper bainite, fresh martensite, tempered martensite, lower bainite, and retained γ: 95% to 100% by area percentage, and retained γ: 4% to 15% by volume percentage, retained $\gamma_{UB}$ with a grain width in the range of 0.25 to 0.60 µm, a grain length in the range of 1.5 to 15 µm, and an aspect ratio in the range of 4 to 25 has an area percentage $S_{\gamma UB}$ in the range of 0.2% to 7.0%, retained $\gamma_{LB}$ with a grain width in the range of 0.08 to 0.24 µm, a grain length in the range of 0.6 to 15 µm, and an aspect ratio in the range of 4 to 40 has a distribution number $N_{\gamma LB}$ in the range of 10 to 120 per 100 µm², fresh martensite with an equivalent circular grain diameter in the range of 0.4 to 1.0 µm and an aspect ratio of 3 or less and/or retained γ grains with an equivalent circular grain diameter in the range of 0.4 to 1.0 µm and an aspect ratio of 3 or less have a total area percentage $S_{\gamma Fine}$ in the range of 0.4% to 5.0%, and fresh martensite with an equivalent circular grain diameter in the range of 1.2 to 20 µm and an aspect ratio of 3 or less and/or retained γ grains with an equivalent circular grain diameter in the range of 1.2 to 20 µm and an aspect ratio of 3 or less have a total area percentage $S_{\gamma Block}$ in the range of 4% or less (including 0%).

[3] The steel sheet according to [1] or [2], wherein a ratio of an area percentage $S_{UB}$ of ferrite or upper bainite adjacent to the retained $\gamma_{UB}$ to the area percentage $S_{\gamma UB}$ satisfies $S_{UB}/S_{\gamma UB} \geq 3.5$.

[4] The steel sheet according to any one of [1] to [3], wherein a region with a C concentration in the range of 0.6% to 1.3% with an adjacent region having a C concentration of 0.07% or less in the microstructure has a total area percentage $S_{C\ concentration}$ in the range of 0.1% to 5%.

[5] The steel sheet according to [4], wherein the region with a C concentration in the range of 0.6% to 1.3% with the adjacent region having a C concentration of 0.07% or less is retained γ.

[6] The steel sheet according to [5], wherein the region with a C concentration in the range of 0.6% to 1.3% with the adjacent region having a C concentration of 0.07% or less is retained $\gamma_{UB}$ grains.

[7] The steel sheet according to any one of [3] to [6], wherein the adjacent region contains upper bainite.

[8] The steel sheet according to any one of [1] to [7], wherein the composition further contains, on a mass percent basis: one or two selected from Ti: 0.002% to 0.1% and B: 0.0002% to 0.01%.

[9] The steel sheet according to any one of [1] to [8], wherein the composition further contains, on a mass percent basis: one or two or more selected from Cu: 0.005% to 1%, Ni: 0.01% to 1%, Cr: 0.01% to 1.0%, Mo: 0.01% to 0.5%, V: 0.003% to 0.5%, Nb: 0.002% to 0.1%, Zr: 0.005% to 0.2%, and W: 0.005% to 0.2%.

[10] The steel sheet according to any one of [1] to [9], wherein the composition further contains, on a mass percent basis: one or two or more selected from Ca: 0.0002% to 0.0040%, Ce: 0.0002% to 0.0040%, La: 0.0002% to 0.0040%, Mg: 0.0002% to 0.0030%, Sb: 0.002% to 0.1%, and Sn: 0.002% to 0.1%.

[11] The steel sheet according to any one of [1] to [10], wherein the steel sheet has a tensile strength in the range of 780 to 1450 MPa.

[12] The steel sheet according to any one of [1] to [11], including a galvanized layer on a surface of the steel sheet.

[13] A method for producing a steel sheet, the method including: hot rolling and cold rolling a steel slab with the composition described in any one of [1], [2], and [8] to [10] and annealing the cold-rolled steel sheet at an annealing temperature in the range of 810° C. to 900° C.;

then cooling the steel sheet at an average cooling rate of 1° C./s to 2000° C./s in the temperature range of 810° C. to 700° C. and cooling the steel sheet at an average cooling rate of 10° C./s to 2000° C./s in the temperature range of 700° C. to 490° C.;

holding the steel sheet in the temperature range of 490° C. to 405° C. for 10 to 200 seconds;

cooling the steel sheet at an average cooling rate of 10° C./s to 100° C./s in the temperature range of 405° C. to 310° C.;

cooling the steel sheet at an average cooling rate of 0.4° C./s or more and less than 20° C./s in the temperature range of 310° C. to 255° C., cooling the steel sheet at an average cooling rate of 2° C./s or more and less than 30° C./s in the temperature range of 255° C. to a cooling stop temperature Tsq in the range of 254° C. to 220° C.;

heating the steel sheet at an average heating rate of 2° C./s or more in the temperature range of Tsq to 350° C., and holding the steel sheet at 350° C. to 550° C. for 20 to 3000 seconds; and cooling the steel sheet to a temperature in the range of 350° C. to 50° C. or less at an average cooling rate of 0.1° C./s or more.

Advantageous Effects

The disclosed embodiments can provide a steel sheet with high ductility and very high stretch-flangeability. The disclosed embodiments can also achieve higher strength of the steel sheet.

BRIEF DESCRIPTION OF THE DRAWINGS

FIG. 1 is an example of a SEM image.

DETAILED DESCRIPTION

Figure 2:
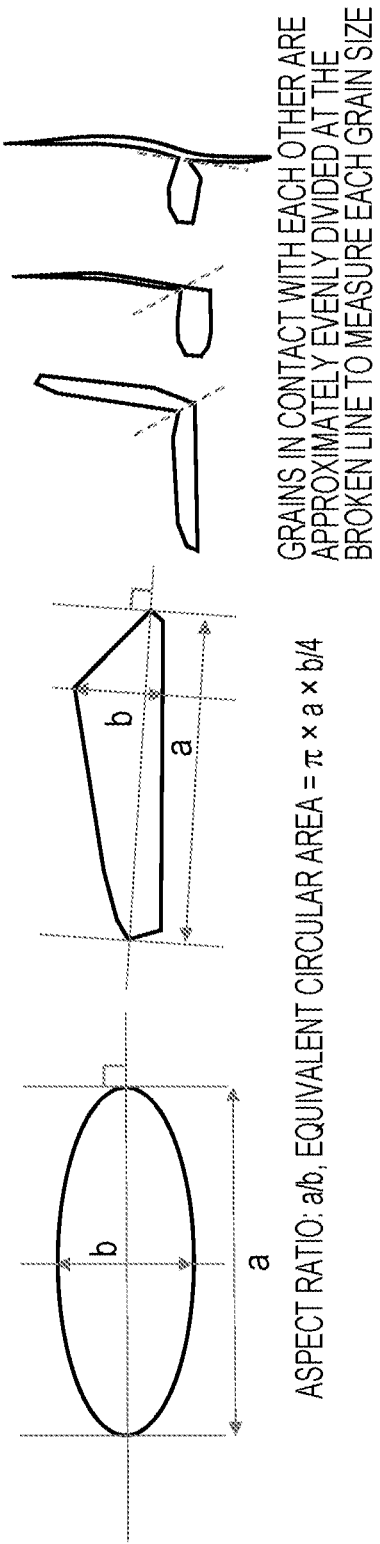
FIG. 2 is an explanatory view of the aspect ratio, grain width, and grain length.

The disclosed embodiments are specifically described below. The disclosed embodiments are not limited to the following embodiments.

A steel sheet according to the disclosed embodiments has a particular composition and a particular steel microstructure. Thus, a steel sheet according to the disclosed embodiments is described below in the order of composition and steel microstructure.

A steel sheet according to the disclosed embodiments contains the following components. The unit "%" of the component content in the following description means "% by mass".

C: 0.06% to 0.25%

C is contained from the perspective of securing the area percentage of tempered martensite to ensure a predetermined strength, from the perspective of securing the volume percentage of retained γ to improve ductility, and from the perspective of being concentrated in retained γ to stabilize the retained γ and improve ductility. A C content of less than 0.06% results in insufficient strength and ductility of the steel sheet. The lower limit of the C content is therefore 0.06%, preferably 0.09% or more, more preferably 0.11% or more. A C content of more than 0.25% results in a delay in upper bainite transformation during intermediate holding in the course of cooling and makes it difficult to form plate-like retained $\gamma_{UB}$ adjacent to a predetermined amount of upper bainite transformation. This results in a decrease in ductility. This also results in an increase in massive martensite or massive retained γ and a decrease in stretch-flangeability. This also results in significant degradation in various characteristics, such as spot weldability, bendability, and hole expandability, of the steel sheet. Thus, the upper limit of the C content is 0.25%. It is desirable that the C content be 0.22% or less from the perspective of improving ductility and spot weldability. It is further desirable that the C content be 0.20% or less from the perspective of further improving ductility and spot weldability.

Si: 0.6% to 2.5%

Si is contained from the perspective of strengthening ferrite to increase strength and from the perspective of reducing carbide formation in martensite or bainite to improve the stability of retained γ and improve ductility. The Si content is 0.6% or more from the perspective of reducing carbide formation to improve ductility. The Si content is preferably 0.8% or more, more preferably 1.1% or more, from the perspective of improving ductility. A Si content of more than 2.5% results in extremely high rolling load and makes it difficult to produce a thin sheet. This also impairs chemical conversion treatability and the toughness of a weld. Thus, the Si content is 2.5% or less. The Si content is preferably less than 2.0% from the perspective of ensuring chemical conversion treatability and the toughness of a material and a weld. The Si content is preferably 1.8% or less, more preferably 1.5% or less, from the perspective of ensuring the toughness of a weld.

Mn: 2.3% to 3.5%

Mn is an important element from the perspective of securing a predetermined area percentage of tempered martensite and/or bainite to ensure strength, from the perspective of decreasing the Ms point of retained γ to stabilize retained γ and improve ductility, from the perspective of reducing carbide formation in bainite to improve ductility in the same manner as in Si, and from the perspective of increasing the volume percentage of retained γ to improve ductility. To produce these effects, the Mn content is 2.3% or more. In a method that utilizes bainite transformation in a final process among known heat treatment methods, a Mn content of 2.3% or more results in a large amount of residual massive microstructure containing hard martensite and retained γ and results in a decrease in stretch-flangeability. In the disclosed embodiments, however, due to a microstructure formed by using a heat treatment method described later, a massive microstructure can be decreased even in the presence of a large amount of Mn, and retained γ stabilizing effects and volume percentage increasing effects of Mn can be produced. From the perspective of stabilizing retained γ to improve ductility, the Mn content is preferably 2.5% or more, preferably 2.6% or more, more preferably 2.7% or more. A Mn content of more than 3.5% results in a considerable delay in bainite transformation and makes it difficult to ensure high ductility. A Mn content of more than 3.5% also makes it difficult to prevent the formation of massive coarse γ or massive coarse martensite and results in a decrease in stretch-flangeability. Thus, the Mn content is 3.5% or less. The Mn content is preferably 3.2% or less from the perspective of promoting bainite transformation to ensure high ductility. The Mn content is more preferably 3.1% or less.

P: 0.02% or Less

Although P is an element that strengthens steel, a high P content results in low spot weldability. Thus, the P content is 0.02% or less. From the perspective of improving spot weldability, the P content is preferably 0.01% or less. Although P is not necessarily contained, the P content is preferably 0.001% or more from the perspective of production costs.

S: 0.01% or Less

Although S has the effect of improving scale detachability in hot rolling and the effect of suppressing nitriding while annealing, S is an element that has great adverse effects on spot weldability, bendability, and hole expandability. To reduce these adverse effects, the S content is 0.01% or less. In the disclosed embodiments, spot weldability tends to deteriorate due to very high C, Si, and Mn contents. From the perspective of improving spot weldability, the S content is preferably 0.0020% or less, more preferably less than 0.0010%. Although S is not necessarily contained, the S content is preferably 0.0001% or more, more preferably 0.0005% or more, from the perspective of production costs.

Sol. Al: Less than 0.50%

Al is contained for deoxidation or to stabilize retained γ instead of Si. It is desirable that the lower limit of sol. Al be, but not limited to, 0.01% or more for stable deoxidation. On the other hand, 0.50% or more sol. Al results in very low material strength and adversely affects chemical conversion treatability. Thus, the sol. Al content is less than 0.50%. To achieve high strength, the sol. Al content is preferably less than 0.20%, more preferably 0.10% or less.

N: Less than 0.015%

N is an element that forms a nitride, such as BN, AlN, or TiN, in steel and is an element that impairs the hot ductility and surface quality of steel. In steel containing B, N has the detrimental effect of eliminating the effects of B through the formation of BN. A N content of 0.015% or more results in very low surface quality. Thus, the N content is less than 0.015%, preferably 0.010% or less. Although N is not necessarily contained, the N content is preferably 0.0001% or more, more preferably 0.001% or more, from the perspective of production costs.

The composition of a steel sheet according to the disclosed embodiments may contain the following optional elements in addition to the components described above.

Ti: 0.002% to 0.1%

Ti fixes N as TiN in steel and has the effect of improving hot ductility and the effect of improving the hardenability of B. Precipitation of TiC is effective in refining a microstructure. To produce these effects, it is desirable that the Ti content be 0.002% or more. From the perspective of sufficiently fixing N, the Ti content is preferably 0.008% or more, more preferably 0.010% or more. On the other hand, a Ti content of more than 0.1% results in an increase in rolling load and a decrease in ductility due to an increase in the amount of precipitation strengthening. Thus, it is desirable that the Ti content be 0.1% or less. The Ti content is more preferably 0.05% or less. To ensure high ductility, the Ti content is still more preferably 0.03% or less.

B: 0.0002% to 0.01%

B is an element that improves the hardenability of steel and has the advantage of facilitating the formation of a predetermined area percentage of tempered martensite and/or bainite. Residual solid solution B improves resistance to delayed fracture. To produce such effects of B, the B content is preferably 0.0002% or more. The B content is more preferably 0.0005% or more, still more preferably 0.0010% or more. On the other hand, a B content of more than 0.01% results in not only the saturation of the effects but also very low hot ductility and surface defects. Thus, the B content is preferably 0.01% or less, more preferably 0.0050% or less, still more preferably 0.0030% or less.

Cu: 0.005% to 1%

Cu improves corrosion resistance in the operating environment of automobiles. A corrosion product of Cu is effective in covering the surface of a steel sheet and suppressing hydrogen invasion in the steel sheet. Cu is an element that is incorporated when scrap is used as a raw material. Allowing the incorporation of Cu allows recycled materials to be used as raw materials and can reduce production costs. From such a perspective, the Cu content is preferably 0.005% or more. From the perspective of improving resistance to delayed fracture, it is desirable that the Cu content be 0.05% or more, preferably 0.10% or more. An excessively high Cu content, however, results in surface defects. Thus, it is desirable that the Cu content be 1% or less, preferably 0.4% or less, more preferably 0.2% or less.

Ni: 0.01% to 1%

Like Cu, Ni is an element that can improve corrosion resistance. Ni can reduce the occurrence of surface defects, which tend to occur in the presence of Cu. Thus, it is desirable that the Ni content be 0.01% or more, preferably 0.04% or more, more preferably 0.06% or more. An excessively high Ni content, however, results in uneven formation of scale in a furnace and results in surface defects. An excessively high Ni content also results in increased costs. Thus, the Ni content is 1% or less, preferably 0.4% or less, more preferably 0.2% or less.

Cr: 0.01% to 1.0%

Cr can be contained to improve the hardenability of steel and to reduce carbide formation in martensite or upper/lower bainite. To produce such effects, it is desirable that the Cr content be 0.01% or more, preferably 0.03% or more, more preferably 0.06% or more. An excessively high Cr content, however, results in low pitting corrosion resistance. Thus, the Cr content is 1.0% or less, preferably 0.8% or less, more preferably 0.4% or less.

Mo: 0.01% to 0.5%

Mo can be contained to improve the hardenability of steel and to reduce carbide formation in martensite or upper/lower bainite. To produce such effects, the Mo content is preferably 0.01% or more, more preferably 0.03% or more, still more preferably 0.06% or more. However, Mo significantly impairs the chemical conversion treatability of a cold-rolled steel sheet. Thus, the Mo content is preferably 0.5% or less. From the perspective of improving chemical conversion treatability, the Mo content is more preferably 0.15% or less.

V: 0.003% to 0.5%

V can be contained to improve the hardenability of steel, to reduce carbide formation in martensite or upper/lower bainite, to refine a microstructure, and to precipitate carbide and improve resistance to delayed fracture. To produce such effects, it is desirable that the V content be 0.003% or more, preferably 0.005% or more, more preferably 0.010% or more. A high V content, however, results in a great decrease in castability. Thus, it is desirable that the V content be 0.5% or less, preferably 0.3% or less, more preferably 0.1% or less.

Nb: 0.002% to 0.1%

Nb can be contained to refine a steel microstructure and increase the strength of the steel microstructure, to promote bainite transformation through grain refining, to improve bendability, and to improve resistance to delayed fracture. To produce such effects, it is desirable that the Nb content be 0.002% or more, preferably 0.004% or more, more preferably 0.010% or more. A high Nb content, however, results in excessive precipitation strengthening and a decrease in ductility. A high Nb content also results in an increase in rolling load and a decrease in castability. Thus, it is desirable that the Nb content be 0.1% or less, preferably 0.05% or less, more preferably 0.03% or less.

Zr: 0.005% to 0.2%

Zr can be contained to improve the hardenability of steel, to reduce carbide formation in bainite, to refine a microstructure, and to precipitate carbide and improve resistance to delayed fracture. To produce such effects, it is desirable that the Zr content be 0.005% or more, preferably 0.008% or more, more preferably 0.010% or more. A high Zr content, however, results in an increased amount of coarse precipitate, such as ZrN or ZrS, remaining unsolved during slab heating before hot rolling and results in a decrease in resistance to delayed fracture. Thus, it is desirable that the Zr content be 0.2% or less, preferably 0.15% or less, more preferably 0.08% or less.

W: 0.005% to 0.2%

W can be contained to improve the hardenability of steel, to reduce carbide formation in bainite, to refine a microstructure, and to precipitate carbide and improve resistance to delayed fracture. To produce such effects, it is desirable that the W content be 0.005% or more, preferably 0.008% or more, more preferably 0.010% or more. A high W content, however, results in an increased amount of coarse precipitate, such as WN or WS, remaining unsolved during slab heating before hot rolling and results in a decrease in resistance to delayed fracture. Thus, it is desirable that the W content be 0.2% or less, preferably 0.15% or less, more preferably 0.08% or less.

Ca: 0.0002% to 0.0040%

Ca fixes S as CaS and contributes to improved bendability or improved resistance to delayed fracture. Thus, the Ca content is preferably 0.0002% or more, more preferably 0.0005% or more, more preferably 0.0010% or more. A high Ca content, however, results in low surface quality or bendability. Thus, it is desirable that the Ca content be 0.0040% or less, preferably 0.0035% or less, more preferably 0.0020% or less.

Ce: 0.0002% to 0.0040%

Like Ca, Ce also fixes S and contributes to improved bendability or improved resistance to delayed fracture. Thus, the Ce content is preferably 0.0002% or more, more preferably 0.0004% or more, still more preferably 0.0006% or more. A high Ce content, however, results in low surface quality or bendability. Thus, it is desirable that the Ce content be 0.0040% or less, preferably 0.0035% or less, more preferably 0.0020% or less.

La: 0.0002% to 0.0040%

Like Ca, La also fixes S and contributes to improved bendability or improved resistance to delayed fracture. Thus, the La content is preferably 0.0002% or more, more preferably 0.0004% or more, still more preferably 0.0006% or more. A high La content, however, results in low surface quality or bendability. Thus, it is desirable that the La content be 0.0040% or less, preferably 0.0035% or less, more preferably 0.0020% or less.

Mg: 0.0002% to 0.0030%

Mg fixes O as MgO and contributes to improved resistance to delayed fracture. Thus, the Mg content is preferably 0.0002% or more, more preferably 0.0004% or more, still more preferably 0.0006% or more. A high Mg content, however, results in low surface quality or bendability. Thus, it is desirable that the Mg content be 0.0030% or less, preferably 0.0025% or less, more preferably 0.0010% or less.

Sb: 0.002% to 0.1%

Sb suppresses oxidation or nitriding of a surface layer of a steel sheet and reduces a decrease in the C or B content on the surface layer. A smaller decrease in the C or B content results in suppressed ferrite formation on a surface layer of a steel sheet, higher strength of a steel sheet, and improved resistance to delayed fracture. From such a perspective, it is desirable that the Sb content be 0.002% or more, preferably 0.004% or more, more preferably 0.006% or more. An Sb content of more than 0.1%, however, results in a decrease in castability, segregation in a prior γ grain boundary, and a decrease in resistance to delayed fracture of a shear end face. Thus, it is desirable that the Sb content be 0.1% or less, preferably 0.04% or less, more preferably 0.03% or less.

Sn: 0.002% to 0.1%

Sn suppresses oxidation or nitriding of a surface layer of a steel sheet and reduces a decrease in the C or B content on the surface layer. A smaller decrease in the C or B content results in suppressed ferrite formation on a surface layer of a steel sheet, higher strength of a steel sheet, and improved resistance to delayed fracture. From such a perspective, it is desirable that the Sn content be 0.002% or more, preferably 0.004% or more, more preferably 0.006% or more. A Sn content of more than 0.1%, however, results in a decrease in castability. This also results in segregation of Sn in a prior γ grain boundary and a decrease in resistance to delayed fracture of a shear end face. Thus, it is desirable that the Sn content be 0.1% or less, preferably 0.04% or less, more preferably 0.03% or less.

When these optional components are contained below their respective lower limits, optional elements below their lower limits do not reduce the advantages of the disclosed embodiments. A steel sheet according to the present embodiment contains these components, and the remainder other than these components includes Fe (iron) and incidental impurities. The remainder is preferably composed of Fe and incidental impurities.

The steel microstructure of a steel sheet according to the disclosed embodiments is described below.

Ferrite: 5% or Less

To ensure a high λ, ferrite is 5% by area percentage or less, preferably 4% or less, more preferably 2% or less. Ferrite, as used herein, refers to polygonal ferrite.

Microstructure composed of one or two or more of upper bainite, fresh martensite, tempered martensite, lower bainite, and retained γ: 95% to 100%

To ensure predetermined strength, ductility, and stretch-flangeability, the total area percentage of upper bainite, fresh martensite, tempered martensite, lower bainite, and retained γ in the remainder other than polygonal ferrite ranges from 95% to 100%. The lower limit is preferably 96% or more, more preferably 98% or more. The area percentage of upper bainite, fresh martensite, tempered martensite, lower bainite, and retained γ was observed in a SEM photograph. Each microstructure content is often in the following range. The area percentage of upper bainite ranges from 1% to 30%. The area percentage of fresh martensite ranges from 0% to 20%. The area percentage of tempered martensite ranges from 3% to 40%. The area percentage of lower bainite ranges from 5% to 70%.

Retained γ: 4% to 15%

To ensure high ductility, retained γ constitutes 4% by volume percentage or more, preferably 5% or more, more preferably 7% or more, of the entire steel microstructure. The retained γ content includes retained γ formed adjacent to upper bainite and retained γ formed adjacent to martensite or lower bainite. An excessive increase in retained γ content results in a decrease in strength, a decrease in stretch-flangeability, and a decrease in resistance to delayed fracture. Thus, the volume percentage of retained γ is 15% or less, preferably 13% or less. The "volume percentage" can be regarded as "area percentage".

Retained $\gamma_{UB}$ with a grain width in the range of 0.25 to 0.60 μm, a grain length in the range of 1.0 to 15 μm, and an aspect ratio in the range of 3.1 to 25 has an area percentage $S_{\gamma UB}$ in the range of 0.2% to 7.0%.

In a production method described later, plate-like retained $\gamma_{UB}$ formed adjacent to upper bainite (bainitic ferrite) containing little carbide can be produced by holding in the intermediate temperature range of 490° C. to 405° C. in a cooling process. Ductility is improved by even the formation of a minute amount of retained $\gamma_{UB}$ with a grain width in the range of 0.25 to 0.60 μm, a grain length in the range of 1.0 to 15 μm, and an aspect ratio in the range of 3.1 to 25. This effect is produced by ensuring a retained $\gamma_{UB}$ area percentage $S_{\gamma UB}$ of 0.2% or more. Thus, the $S_{\gamma UB}$ is 0.2% or more. It is desirable that the $S_{\gamma UB}$ be 0.3% or more because it greatly improves ductility. The $S_{\gamma UB}$ is preferably 0.4% or more. To ensure higher ductility, retained $\gamma_{UB}$ preferably has a grain width in the range of 0.25 to 0.60 μm, a grain length in the range of 1.5 to 15 μm, and an aspect ratio in the range of 4 to 25. It should be noted here that, even in a steel microstructure with the same grain width, grain length, and aspect ratio, a low C concentration level results in fresh martensite and not only has very small contribution to improved ductility but also greatly impairs stretch-flangeability. This microstructure is one of microstructures referred to as MA, and microstructures according to the present specification are stable γ with greatly concentrated C, which is different from and must be distinguished from the MA. Thus, as described later, the microstructures according to the present specification are only those identified as an fcc structure by EBSD. An excessively large amount of plate-like retained $\gamma_{UB}$ results in excessive carbon consumption and a large strength reduction. This also results in a decrease in stretch-flangeability and a decrease in resistance to delayed fracture. Thus, the $S_{\gamma UB}$ is 7.0% or less, preferably 5.0% or less, more preferably 4.0% or less. The area percentage refers to the area percentage relative to the entire steel microstructure. The area percentage of retained $\gamma_{UB}$ can be distinguished from another metal phase (bcc) by acquiring phase map data using EBSD and measuring an fcc microstructure.

The ratio of the area percentage $S_{UB}$ to the area percentage $S_{\gamma UB}$ of ferrite or upper bainite adjacent to retained $\gamma_{UB}$ satisfies $S_{UB}/S_{\gamma UB} \geq 3.5$.

The ductility improving effect of retained $\gamma_{UB}$ can be improved by controlling the area ratio with respect to ferrite or upper bainite formed adjacent to the retained $\gamma_{UB}$. To ensure high ductility, it is desirable that $S_{UB}/S_{\gamma UB}$ be 3.5 or more. From the perspective of improving ductility, $S_{UB}/S_{\gamma UB}$ is preferably 4.0 or more. Although there is no upper limit, for the present thermal history, 15 or less is preferred.

Retained $\gamma_{LB}$ with a grain width in the range of 0.08 to 0.24 μm, a grain length in the range of 0.6 to 15 μm, and an aspect ratio in the range of 4 to 40 has a distribution number $N_{\gamma LB}$ in the range of 10 to 120 per 100 μm².

In a production method described later, film-like retained $\gamma_{LB}$ (sometimes also referred to as retained $\gamma_{LB}$ grains) formed adjacent to martensite and lower bainite can be formed by providing second intermediate holding that slows down the cooling rate in the temperature range of 310° C. to 255° C. in a cooling process. The film-like retained $\gamma_{LB}$ grains are grains with a grain width in the range of 0.08 to 0.24 μm, a grain length in the range of 0.6 to 15 μm, and an aspect ratio in the range of 4 to 40. The grains are composed mainly of retained γ and partly contain carbide and/or martensite. The film-like retained $\gamma_{LB}$ grains were identified by shape in a SEM photograph. From the perspective of improving ductility, the retained $\gamma_{LB}$ grain distribution number $N_{\gamma LB}$ is 10 or more per 100 μm². From the perspective of improving ductility, the $N_{\gamma LB}$ is preferably 20 or more, more preferably 30 or more, per 100 μm². An $N_{\gamma LB}$ of more than 120 per 100 μm² results in excessive hardness and a decrease in ductility. Thus, the $N_{\gamma LB}$ is 120 or less per 100 μm². From the perspective of improving ductility, the $N_{\gamma LB}$ is preferably 100 or less, more preferably 80 or less, per 100 μm².

As described above, those with a grain width of 0.25 μm or more are referred to as plate-like. On the other hand, those with a grain width of 0.24 μm or less are referred to as film-like.

Fresh martensite with an equivalent circular grain diameter in the range of 0.4 to 1.0 μm and an aspect ratio of 3 or less and/or retained γ grains with an equivalent circular grain diameter in the range of 0.4 to 1.0 μm and an aspect ratio of 3 or less have a total area percentage $S_{\gamma Fine}$ in the range of 0.4% to 5.0%.

Fine fresh martensite or retained γ grains (sometimes also referred to as retained γ) with an equivalent circular grain diameter in the range of 0.4 to 1.0 μm and an aspect ratio of 3 or less have a small effect of decreasing λ or L. El and a large effect of increasing El. Thus, the total area percentage $S_{\gamma Fine}$ of fresh martensite and retained γ grains with an equivalent circular grain diameter in the range of 0.4 to 1.0 μm and an aspect ratio of 3 or less is 0.4% or more. From the perspective of improving ductility, the $S_{\gamma Fine}$ is preferably 0.7% or more. An excessively increased $S_{\gamma Fine}$ is responsible for a decrease in λ. Thus, the area percentage is 5.0% or less. From the perspective of improving λ, the total area percentage is more preferably 4.0% or less.

Fresh martensite with an equivalent circular grain diameter in the range of 1.2 to 20 μm and an aspect ratio of 3 or less and/or retained γ grains with an equivalent circular grain diameter in the range of 1.2 to 20 μm and an aspect ratio of 3 or less have a total area percentage $S_{\gamma Block}$ in the range of 4% or less.

A large amount of bainite transformation in a final tempering process has left a large amount of massive martensite or massive retained γ. To prevent this, Mn has been decreased to 2% or less to promote bainite transformation. A low Mn content, however, has reduced the stabilizing effect or the volume percentage increasing effect of retained γ and has impaired the ductility. On the other hand, both the utilization of bainite transformation and the decrease in the amount of massive microstructure are possible in the disclosed embodiments in which an appropriate cooling treatment is applied to a steel sheet containing a large amount of Mn. A massive microstructure that adversely affects stretch-flangeability is fresh martensite with an equivalent circular grain diameter in the range of 1.2 to 20 μm and an aspect ratio of 3 or less and retained γ grains with an equivalent circular grain diameter in the range of 1.2 to 20 μm and an aspect ratio of 3 or less. Thus, the total area percentage $S_{\gamma Block}$ can be decreased to 4% or less to ensure high stretch-flangeability and local ductility. The $S_{\gamma Block}$ is preferably 3% or less to ensure high stretch-flangeability and local ductility. The $S_{\gamma Block}$ may be 0%. In the case where either fresh martensite with an equivalent circular grain diameter in the range of 1.2 to 20 μm and an aspect ratio of 3 or less or retained γ grains with an equivalent circular grain diameter in the range of 1.2 to 20 μm and an aspect ratio of 3 or less is contained alone, the area percentage of that contained is taken as the total area percentage.

A region with a C concentration in the range of 0.6% to 1.3% with an adjacent region having a C concentration of 0.07% or less has a total area percentage $S_{C\ concentration}$ in the range of 0.1% to 5%.

The area percentage of a region with a higher C concentration than the surroundings can be controlled to improve ductility. More specifically, the total area percentage $S_{C\ concentration}$ of the region with a C concentration in the range of 0.6% to 1.3% with the adjacent region having a C concentration of 0.07% or less can be adjusted in the range of 0.1% to 5% to improve ductility. The adjacent region refers to a region with a C concentration in the range of 0.6% to 1.3% and adjacent to a region with a C concentration of 0.07% or less.

From the perspective of improving ductility, the region with a C concentration in the range of 0.6% to 1.3% with the adjacent region having a C concentration of 0.07% or less is preferably retained γ, more preferably retained $\gamma_{UB}$ grains (sometimes also referred to as retained $\gamma_{UB}$). Part or all of the adjacent region preferably contains upper bainite. In the following description, the region with a C concentration in the range of 0.6% to 1.3% with the adjacent region having a C concentration of 0.07% or less is retained $\gamma_{UB}$, and the adjacent region is upper bainite. When the region is retained $\gamma_{UB}$, and the adjacent region is upper bainite, the $S_{C\ concentration}$ is referred to as $S_{\gamma UB}*$.

In retained $\gamma_{UB}$ formed adjacent to upper bainite, at least one side of the grains tends to have a very low C content. C in bainite (bainitic ferrite) formed at a high temperature in the range of 405° C. to 490° C. detaches easily to austenite and is efficiently concentrated in plate-like retained $\gamma_{UB}$. Consequently, the C content of the plate-like retained $\gamma_{UB}$ ranges from 0.6% to 1.3%, thus contributing to improved ductility. The C content of the surrounding upper bainite region is decreased to 0.07% or less. To further improve ductility, the area percentage $S_{\gamma UB}*$ of a retained γ region with such a C distribution state preferably ranges from 0.1% to 5%. An $S_{\gamma UB}*$ of 0.2% or more results in a significant increase in ductility. Thus, it is further desirable that the $S_{\gamma UB}*$ be 0.2% or more. The upper limit is preferably 4% or less, more preferably 3% or less.

A method for measuring a steel microstructure is described below.

The area percentage of ferrite was measured by cutting out a cross section in the thickness direction parallel to the rolling direction, mirror-polishing the cross section, corroding the cross section with 3% nital, and observing 10 fields at a ¼ thickness position with SEM at a magnification of 5000. Target ferrite was a relatively equiaxed polygonal ferrite with little carbide inside. This is the blackest region in SEM. When it was difficult to distinguish whether the microstructure on both sides of plate-like retained $\gamma_{UB}$ is upper bainite or ferrite, the area percentage was calculated by regarding a region of polygonal ferrite with an aspect ratio of ≤2.0 as ferrite and a region with an aspect ratio>2.0 as upper bainite (bainitic ferrite). As illustrated in FIG. 2, the aspect ratio a/b was calculated from the major axis length a, which is the longest grain length, and the minor axis length b, which is the longest grain length in a direction perpendicular to the major axis. In the case of a plurality of grains in contact with each other, the grains are approximately evenly divided at the broken line shown in FIG. 2 in a region where individual grains are in contact with each other, and the size of each grain is measured.

The area percentage of a microstructure composed of one or two or more of upper bainite, fresh martensite, tempered martensite, lower bainite, and retained γ was measured in the same manner as in ferrite. This area percentage is the area percentage of the region other than the ferrite. The area percentage included the area percentage of carbide, because the area percentage of carbide was very small.

The volume percentage of retained γ was determined by X-ray diffractometry after chemical polishing at a ¼ thickness position from the surface layer. The incident X-ray was from a Co-Kα radiation source. The area percentage of retained austenite was calculated from the intensity ratios of the (200), (211), and (220) planes of ferrite to the (200), (220), and (311) planes of austenite. Because retained γ is randomly distributed, the volume percentage of retained γ determined by X-ray diffractometry is equal to the area percentage of retained γ in the steel microstructure.

The shape and area percentage of plate-like retained $\gamma_{UB}$ formed adjacent to upper bainite were determined by electropolishing a cross section in the thickness direction parallel to the rolling direction of the steel sheet at a ¼ thickness position, acquiring phase map data using EBSD, and measuring an fcc microstructure. The measured region was 30 μm×30 μm, and 10 fields separated by 50 μm or more from each other were measured. The above methods for measuring the grain size and the aspect ratio were used to determine the grain length (major axis length), the grain width (minor axis length), and the aspect ratio. The area percentage of γ grains with a grain width in the range of 0.25 to 0.60 μm, a grain length in the range of 1.0 to 15 μm, and an aspect ratio in the range of 3.1 to 25 or with a grain width in the range of 0.25 to 0.60 μm, a grain length in the range of 1.5 to 15 μm, and an aspect ratio in the range of 4 to 25 was determined as $S_{\gamma UB}$. The same fields were etched with 3% nital, and the total area percentage $S_{UB}$ of ferrite or bainite adjacent to one side or both sides of plate-like retained $\gamma_{UB}$ was determined.

The following were also determined from SEM photographs in the same manner: the distribution number of retained $\gamma_{LB}$ with a grain width in the range of 0.08 to 0.24 μm, a grain length in the range of 0.6 to 15 μm, and an aspect ratio in the range of 4 to 40, the area percentages of fresh martensite with an equivalent circular grain diameter in the range of 1.2 to 20 μm and an aspect ratio of 3 or less and retained γ grains with an equivalent circular grain diameter in the range of 1.2 to 20 μm and an aspect ratio of 3 or less, and the shapes (length, aspect ratio) and area percentages of fresh martensite with an equivalent circular grain diameter in the range of 0.4 to 1.0 μm and an aspect ratio of 3 or less and retained γ grains with an equivalent circular grain diameter in the range of 0.4 to 1.0 μm and an aspect ratio of 3 or less.

The volume percentage of retained γ refers to the volume percentage with respect to the entire steel sheet. $S_{\gamma UB}$, $S_{\gamma Fine}$, and $S_{\gamma Block}$ refer to the area percentages with respect to all the regions in the microstructure. $N_{\gamma LB}$ refers to the density of distribution number in a region composed of upper bainite, fresh martensite, tempered martensite, lower bainite, and retained γ (other than ferrite).

The equivalent circular grain size (equivalent circular grain diameter) was determined by observing individual grains with SEM, determining the area percentage, and calculating the equivalent circular diameter.

Figure 3:
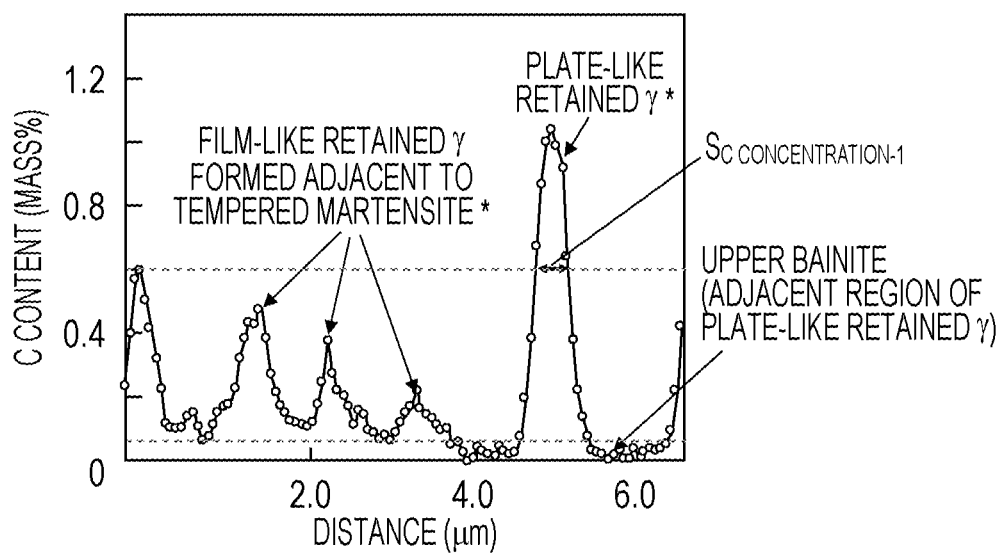
FIG. 3 is an example of a graph showing the relationship between the C concentration and the analysis length.

The C concentration (% by mass) of the region with a C concentration in the range of 0.6% to 1.3% with the adjacent region having a C concentration of 0.07% or less and the C concentration (% by mass) of the adjacent region were measured by line analysis in a cross section in the thickness direction parallel to the rolling direction at a ¼ thickness position using a field-emission electron probe microanalyzer (FE-EPMA) JXA-8500F manufactured by JEOL Ltd. at an accelerating voltage of 6 kV, an irradiation current of 7×10⁻⁸ A, and a smallest beam diameter. The analysis length was 6 μm. C profile data were randomly collected at 20 positions separated by 10 μm or more from each other to acquire the average information on the microstructure. To eliminate the influence of contamination, the background was subtracted to equalize the average value of C obtained in each line analysis with the carbon content of the base material. More specifically, when the average of the measured carbon content was greater than the carbon content of the base material, the increase was considered to be contamination, and the value obtained by subtracting the increase from the analytical value at each position was taken as the true C content at the position. For the total area percentage $S_{C\ concentration}$ of the region with C in the range of 0.6% to 1.3% adjacent to the region with a C concentration of 0.07% or less, assuming that a region with the C content at the base of the C peak being 0.07% or less had a random distribution state, the ratio of the region with C in the range of 0.6% to 1.3% in the line analysis result was taken as the area percentage. FIG. 3 is an example of a graph of the relationship between the measured C concentration and the analysis length. In FIG. 3, the region with a C concentration in the range of 0.6% to 1.3% with the adjacent region having a C concentration of 0.07% or less is an $S_{C\ concentration-1}$. A graph as shown in FIG. 3 is derived at 30 positions to obtain the total area percentage $S_{C\ concentration}$ of $S_{C\ concentration-1}$. The shape of the microstructure (plate-like retained γ, film-like retained γ) marked with "*" in FIG. 3 is determined in a SEM photograph.

The C concentration level of the plate-like retained $\gamma_{UB}$ can be determined by the above analytical method. Thus, when the C concentration level ranges from 0.6% to 1.3% in the characteristic evaluation, a metal phase with the C concentration level may be evaluated as the plate-like retained $\gamma_{UB}$.

FIG. 1 is an example of a SEM photograph.

A steel sheet used in the observation of FIG. 1 was produced by annealing 0.18% C-1.5% Si-2.8% Mn steel at 840° C., at which an γ single phase was formed, cooling the steel at 20° C./s in the range of 810° C. to 700° C., cooling the steel at 20° C./s in the range of 700° C. to 490° C., cooling the steel at 20° C./s in the range of 490° C. to 450° C., isothermally holding the steel at 450° C. for 30 seconds, cooling the steel at 15° C./s in the range of 450° C. to 310° C., cooling the steel from 310° C. to 255° C. at 5° C./s, cooling the steel from 255° C. to 245° C. at 6° C./s, heating the steel from 245° C. to 350° C. at 8° C./s, holding the steel at 400° C. for 1080 seconds, and cooling the steel at 15° C./s in the range of 350° C. to 50° C. or less. A vertical cross section at a ¼ thickness position in the rolling direction was polished, corroded with 3% nital, and observed with SEM.

Upper bainite, fresh martensite, tempered martensite, lower bainite, and retained γ are individually evaluated in a SEM photograph. Upper bainite (a) is a microstructure that contains little carbide, has almost no streaked strain (lath interface) inside, is black like ferrite, and has a minor axis width of 0.4 μm or more. There is plate-like retained γ (b) with a grain width in the range of 0.25 to 0.60 μm, a grain length in the range of 1.0 to 15 μm, and an aspect ratio in the range of 3.1 to 25 adjacent to upper bainite or ferrite. Tempered martensite (c) is a region that contains 2.0 to 20 per 1 μm$^2$ of fine carbide grains with an aspect ratio of 4 or less and an equivalent circular diameter in the range of 0.03 to 0.3 μm in the microstructure. Lower bainite (d) is a region that contains 0.1 to 4 per 1 μm$^2$ of film-like retained γ (e) grains with a grain width in the range of 0.08 to 0.24 μm, a grain length in the range of 0.6 μm or more and 15 μm, and an aspect ratio in the range of 4 to 40, or 0.2 to 1.9 per 1 μm$^2$ of fine carbide grains with an aspect ratio of 4 or less and an equivalent circular diameter in the range of 0.03 to 0.3 μm in the microstructure. The tempered martensite and lower bainite contain streaked strain (lath interface) and are slightly grayer than the ferrite or upper bainite. Fresh martensite or retained γ grains with an equivalent circular grain diameter in the range of 1.2 to 20 μm and an aspect ratio of 3 or less remain in a region in which bainite transformation or martensite transformation proceeded insufficiently. Fresh martensite or retained γ grains (f) with an equivalent circular grain diameter in the range of 0.4 to 1.0 μm and an aspect ratio of 3 or less also remain. A black region with little carbide and with an aspect ratio of 2.0 or less is polygonal ferrite (g).

A steel sheet according to the disclosed embodiments preferably has a tensile strength of 780 MPa or more, more preferably 980 MPa or more. The upper limit of the tensile strength is preferably 1450 MPa or less, more preferably 1400 MPa or less, from the perspective of compatibility with other characteristics.

The forming stability of a steel sheet according to the disclosed embodiments is significantly improved by ensuring a hole expanding ratio λ≥50% or more, preferably 55% or more, in the TS: 780 to 1319 MPa grade, or λ≥40% or more, preferably 45% or more, in the TS: 1320 to 1450 MPa.

A method for producing a steel sheet according to the disclosed embodiments is described below.

Hot Rolling

A steel slab is hot-rolled by a method of heating and then rolling the slab, a method of directly rolling a continuously casted slab without heating, or a method of heat-treating a continuously casted slab for a short time and rolling the slab. Hot rolling may be performed in the usual manner. For example, the slab heating temperature ranges from 1100° C. to 1300° C., the soaking temperature ranges from 20 to 300 minutes, the finish rolling temperature ranges from Ar$_3$ transformation point to Ar$_3$ transformation point+200° C., and the coiling temperature ranges from 400° C. to 720° C. The coiling temperature preferably ranges from 430° C. to 530° C. from the perspective of reducing thickness variations and stably ensuring high strength.

Cold Rolling

In cold rolling, the rolling reduction may range from 30% to 85%. From the perspective of stably ensuring high strength and decreasing anisotropy, the rolling reduction preferably ranges from 45% to 85%. When rolling load is high, softening annealing treatment can be performed at 450° C. to 730° C. in a continuous annealing line (CAL) or a box annealing furnace (BAF).

Annealing

After the hot rolling and cold rolling, a steel slab with a predetermined composition is annealed under the conditions specified below. Although annealing equipment is not particularly limited, a continuous annealing line (CAL) or a continuous hot-dip galvanizing line (CGL) is preferred from the perspective of ensuring productivity, a desired heating rate, and a desired cooling rate.

Annealing Temperature: 810° C. to 900° C.

To ensure a predetermined area percentage of tempered martensite and/or bainite and a predetermined volume percentage of retained γ, the annealing temperature ranges from 810° C. to 900° C. To decrease polygonal ferrite to 5% or less, the annealing temperature is adjusted to achieve γ single phase region annealing. 815° C. or more is preferred, and 880° C. or less is preferred.

Average Cooling Rate in Temperature Range of 810° C. to 700° C.: 1° C./s to 2000° C./s After the annealing, cooling is performed at an average cooling rate of 1° C./s to 2000° C./s in the temperature range of 810° C. to 700° C. An average cooling rate of less than 1° C./s results in the formation of a large amount of ferrite and a decrease in strength and λ. 3° C./s or more is more preferred. On the other hand, an excessively high average cooling rate results in a poor sheet shape. Thus, the average cooling rate is 2000° C./s or less, preferably 100° C./s or less, more preferably less than 30° C./s.

Average Cooling Rate in Temperature Range of 700° C. to 490° C.: 10° C./s to 2000° C./s Cooling is performed at 10° C./s or more in the temperature range of 700° C. to 490° C. An average cooling rate of less than 10° C./s results in the formation of a large amount of ferrite and a decrease in strength and λ. 15° C./s or more is more preferred. On the other hand, an excessively high average cooling rate results in a poor sheet shape. Thus, the average cooling rate is 2000° C./s or less, preferably 100° C./s or less, more preferably less than 30° C./s. 29° C./s or less is preferred because this results in a sheet shape with a good level (a sheet warpage of 15 mm or less described later in an example). Furthermore, an average cooling rate of 14° C./s or less is more preferred because this results in a sheet shape with a better level (a sheet warpage of 10 mm or less described later in an example).

Holding Time in Temperature Range of 490° C. to 405° C.: 10 to 200 Seconds

This temperature range can be held for a predetermined time to form upper bainite with little carbide precipitation and plate-like retained $γ_{UB}$ with a high C concentration level adjacent to the upper bainite. This temperature range can be held to control the area percentage ratio $S_{UB}/S_{γUB}$ of these microstructures in a predetermined range. From these perspectives, the temperature range of 490° C. to 405° C. is held for 10 seconds or more. From the perspective of forming plate-like retained $γ_{UB}$ and improving ductility, this temperature range is preferably held for 14 seconds or more. A holding time of more than 200 seconds, however, results in slow formation of plate-like retained $γ_{UB}$, progress of carbon concentration to massive untransformed γ, and an increase in the amount of residual massive microstructure. Thus, the holding time in the temperature range of 490° C. to 405° C. ranges from 10 to 200 seconds. From the perspective of improving stretch-flangeability, the holding time in the temperature range of 490° C. to 405° C. is preferably 40 seconds or less. Holding in this temperature range corresponds to decreasing the average cooling rate to 9° C./s or less in the temperature range. From the perspective of improving ductility, the holding temperature range is preferably 410° C. or more, more preferably 420° C. or more, and preferably 470° C. or less, more preferably 460° C. or less.

Average Cooling Rate in Temperature Range of 405° C. to 310° C.: 10° C./s to 100° C./s After holding in the range of 405° C. to 490° C., rapid cooling to 310° C. is necessary to prevent excessive concentration of carbon to γ. Holding a temperature of more than 310° C. results in the concentration of carbon to massive untransformed γ, suppresses bainite transformation in a subsequent cooling or tempering process, and results in an increase in the amount of massive martensite or retained γ. This results in a decrease in λ. From the perspective of improving λ, the average cooling rate in the temperature range of 405° C. to 310° C. is 10° C./s or more, preferably 12° C./s or more, more preferably 15° C./s or more. An excessively high cooling rate in this temperature range results in a poor sheet shape. Thus, the cooling rate in this temperature range is 100° C./s or less, preferably less than 30° C./s, more preferably less than 20° C./s.

Average Cooling Rate in Temperature Range of 310° C. to 255° C.: 0.4° C./s or More and Less than 20° C./s Second holding is performed by slow cooling in the range of 310° C. to 255° C. This enables the formation of martensite or lower bainite simultaneously with the concentration of carbon to adjacent γ, thus forming film-like retained $\gamma_{LB}$ adjacent to martensite or lower bainite. This improves ductility. Holding at low temperatures decreases the amount of massive microstructure and forms fine martensite or retained γ with an equivalent circular grain size in the range of 0.4 to 1.0 μm. From the perspective of improving ductility, the average cooling rate in this temperature range is 0.4° C./s or more and less than 20° C./s. From the perspective of increasing the amount of film-like retained $\gamma_{LB}$ formed and improving ductility, it is desirable that the average cooling rate in this temperature range be less than 15° C./s, preferably less than 10° C./s, particularly preferably 7° C./s or less.

The cooling rate is most effectively decreased in the range of 310° C. to 301° C., and it is particularly important to specify this temperature range as the cooling rate range, preferred cooling rate range, or more preferred cooling rate range.

Average Cooling Rate in Temperature Range of 255° C. to Cooling Stop Temperature Tsq in Range of 254° C. to 220° C.: 2° C./s or More and Less than 30° C./s The massive microstructure is further decreased by rapid cooling in the temperature range of 255° C. to a cooling stop temperature Tsq in the range of 220° C. to 254° C. In this temperature range, carbide precipitates and prevents the concentration of carbon to retained γ, and therefore rapid cooling is required. From the perspective of preventing a decrease in ductility and decreasing the amount of massive microstructure to improve λ, the average cooling rate in this temperature range must be 2° C./s or more and less than 30° C./s. From the perspective of reducing the formation of carbide, it is desirable that the average cooling rate in this temperature range be 3° C./s or more, preferably 5° C./s or more. An excessively high cooling rate in this temperature range results in insufficient carbon partitioning during the formation of bainite, a decrease in the amount of film-like retained $\gamma_{LB}$, a decrease in ductility, and a decrease in λ due to a hardened second phase. Thus, it is desirable that the cooling rate in this temperature range be 15° C./s or less, preferably less than 10° C./s.

Cooling Stop Temperature Tsq: 220° C. to 254° C.

To disperse fine fresh martensite or fine retained γ with an equivalent circular grain diameter in the range of 0.4 to 1.0 μm and an aspect ratio of 3 or less to ensure high ductility and an appropriate amount of retained γ, the cooling stop temperature Tsq must range from 220° C. to 254° C. A cooling stop temperature of less than 220° C. results in a decrease in the amount of fine martensite or fine retained γ and suppressed partitioning of carbon to retained γ due to carbide precipitation within martensite or lower bainite even for a short holding time. Thus, the cooling stop temperature is 220° C. or more, preferably 230° C. or more. A cooling stop temperature of more than 254° C. results in the presence of residual massive microstructure and a failure to stably achieve high λ. Thus, the cooling stop temperature is 254° C. or less, preferably 250° C. or less.

Average Heating Rate in Temperature Range of Cooling Stop Temperature Tsq to 350° C.: 2° C./s or More Heating for a short time in the temperature range of the cooling stop temperature to 350° C. can suppress carbide precipitation and ensure high ductility. When martensite or lower bainite formed by cooling is reheated to 350° C. or more as a core, upper bainite is formed. These effects cannot be produced when the average heating rate to 350° C. is low. This results in a decrease in the amount of retained γ and a decrease in ductility. Thus, the average heating rate in the temperature range of the cooling stop temperature to 350° C. is 2° C./s or more. From the perspective of reducing carbide precipitation and forming upper bainite while reheating, it is desirable that the average heating rate be 5° C./s or more, preferably 10° C./s or more. The upper limit of the average heating rate is preferably, but not limited to, 50° C./s or less, more preferably 30° C./s or less.

Holding Time in Range of 350° C. to 550° C.: 20 to 3000 Seconds

From the perspective of partitioning C to film-like retained $\gamma_{LB}$ formed adjacent to plate-like retained $\gamma_{UB}$, martensite, or lower bainite formed by intermediate holding to stabilize them, and from the perspective of making a region distributed in a mass as untransformed γ finer by bainite transformation and improving λ, the temperature range of 350° C. to 550° C. is held for 20 to 3000 seconds.

For a holding time in the range of 60 to 3000 seconds in the temperature range of 350° C. to 550° C., the region with a C concentration in the range of 0.6% to 1.3% with the adjacent region having a C concentration of 0.07% or less has a total area percentage $S_{C\ concentration}$ in the range of 0.1% to 5%, and the ductility is further improved.

From the perspective of utilizing the effect of refining untransformed γ by bainite transformation and improving λ, it is desirable that the temperature range of 350° C. to 550° C. be held for 180 seconds or more. Due to the holding, the region with a C concentration in the range of 0.6% to 1.3% with the adjacent region having a C concentration of 0.07% or less has a total area percentage $S_{C\ concentration}$ in the range of 0.2% to 5%, and the ductility is further improved. 1500 seconds or less is preferred, and 1200 seconds or less is more preferred.

Holding the temperature range of 350° C. to 550° C. may also serve as hot-dip galvanizing treatment. In the hot-dip galvanizing treatment, preferably, a steel sheet is immersed in a galvanizing bath in the temperature range of 440° C. to 500° C. to perform the hot-dip galvanizing treatment, and then the amount of coating is adjusted by gas wiping or the like. In the hot-dip galvanizing, a galvanizing bath with an Al content in the range of 0.10% to 0.22% is preferably used. The hot-dip galvanizing treatment may be followed by alloying treatment of zinc coating. The alloying treatment of zinc coating is preferably performed in the temperature range of 470° C. to 550° C.

After that, cooling may be performed to a temperature in the range of 350° C. to 50° C. or less at an average cooling rate of 0.1° C./s or more, and the steel sheet may be subjected to skin pass rolling from the perspective of stabilizing press formability, such as adjusting surface roughness or flattening the sheet shape, or from the perspective of increasing YS. The skin pass elongation percentage preferably ranges from 0.1% to 0.5%. The sheet shape may also be flattened with a leveler. 5° C./s or more is more preferred, and 100° C./s or less is preferred.

From the perspective of improving stretch-flangeability, after the heat treatment or the skin pass rolling, a low-temperature heat treatment may be performed in the temperature range of 100° C. to 300° C. for 30 seconds to 10 days. This treatment causes tempering of martensite formed by the final cooling or the skin pass rolling or causes hydrogen that intruded into the steel sheet while annealing to be eliminated from the steel sheet. The low-temperature heat treatment can decrease hydrogen to less than 0.1 ppm. Electroplating may also be performed. Electroplating is preferably followed by the low-temperature heat treatment from the perspective of decreasing the hydrogen content of the steel.

EXAMPLES

The present examples can provide steel sheets with very high formability that satisfy TS×El≥17000 MPa %, preferably TS×El≥18000 MPa %, more preferably TS×El≥19000 MPa %, and λ≥50% or more, preferably λ≥55% or more, for TS: 780 to 1319 MPa, or λ≥40% or more, preferably λ≥45% or more, for TS: 1320 to 1450 MPa. Steel according to the disclosed embodiments has high local ductility (L. El) of 6.0% or more in a 780 to 1179 MPa grade or 5.0% or more in a 1180 to 1450 MPa grade.

Example 1

A cold-rolled steel sheet 1.2 mm in thickness with a composition listed in Table 1 was processed under the annealing conditions listed in Table 2-1 to produce steel sheets according to the disclosed embodiments and comparative examples.

Part of the steel sheets (cold-rolled steel sheets) were also subjected to hot-dip galvanizing treatment to produce hot-dip galvanized steel sheets (GI). More specifically, a steel sheet was immersed in a galvanizing bath in the temperature range of 440° C. to 500° C. for hot-dip galvanizing treatment. Subsequently, the amount of coating was adjusted by gas wiping or the like. In the hot-dip galvanizing, a galvanizing bath with an Al content in the range of 0.10% to 0.22% was used. After the hot-dip galvanizing treatment, part of the hot-dip galvanized steel sheets were subjected to alloying treatment of zinc coating to produce galvannealed steel sheets (GA). The alloying treatment of zinc coating was performed in the temperature range of 470° C. to 550° C. Part of the steel sheets (cold-rolled steel sheets) were subjected to electroplating to produce electrogalvanized steel sheets (EG).

The steel microstructure was measured by the method described above. Table 2-2 shows the measurement results. The area percentage of plate-like retained $\gamma_{UB}$ formed adjacent to upper bainite was determined as the area percentage $S_{\gamma UB}$ of γ grains with a grain width in the range of 0.25 to 0.60 μm, a grain length in the range of 1.5 to 15 μm, and an aspect ratio in the range of 4 to 25.

JIS No. 5 tensile test specimens were taken from the steel sheets and were subjected to a tensile test (according to JIS Z 2241). Table 2-2 shows TS, El, and L. El.

The stretch-flangeability was evaluated in a hole expanding test according to the specifications of the Japan Iron and Steel Federation standard JFST 1001. More specifically, a 100 mm×100 mm square sample was punched with a punching tool with a punch diameter of 10 mm and a die diameter of 10.3 mm (clearance 13%), and then the hole was widened with a conical punch with a vertex angle of 60 degrees such that a burr formed around the punched hole was on the outside until a crack penetrating the sample occurred. Hole expanding ratio $\lambda$ (%)={$(d-d_0)/d_0$}×100, wherein $d_0$ denotes the initial hole diameter (mm) and d denotes the hole diameter (mm) when a crack occurred.

The examples No. 1, 7, 8, 9, 10, 14, 15, 16, 20, 21, 24, 27, 29, 30, 32, and 33 satisfy TS×El≥17000 MPa % and have a hole expandability ($\lambda$) of 50% or more in the 1180 MPa grade. By contrast, the comparative examples were inferior in at least one of the characteristics.

Examples with an average cooling rate in the range of 15° C./s to 29° C./s in the temperature range of 700° C. to 490° C. had a good sheet warpage in the range of 11 to 15 mm measured by the following method. Examples with an average cooling rate in the range of 5° C./s to 14° C./s had a better sheet warpage in the range of 10 mm or less measured by the following method. The sheet warpage for the evaluation of the sheet shape was evaluated by taking a cut sample 1500 mm in length from an annealed steel sheet, placing the sample on a horizontal flat board, and measuring the maximum value (unit: mm) of the warpage heights on the four sides. When the sample was cut in the longitudinal direction, the clearance of a blade of a shearing machine was 4% (the upper limit of the control range was 10%).

TABLE 1

| Steel No. | Composition (mass %) | | | | | | | | Note |
|---|---|---|---|---|---|---|---|---|---|
| | C | Si | Mn | P | S | sol. Al | N | others | |
| A | 0.188 | 1.50 | 2.65 | 0.004 | 0.0002 | 0.060 | 0.0029 | Ti: 0.015, B: 0.0012, Nb: 0.005 | Example steel |
| B | 0.230 | 1.52 | 2.04 | 0.007 | 0.0012 | 0.040 | 0.0036 | Ti: 0.018, B: 0.0012, Nb: 0.020 | Comparative example steel |
| C | 0.115 | 1.17 | 3.04 | 0.006 | 0.0013 | 0.018 | 0.0040 | — | Example steel |
| D | 0.262 | 1.04 | 2.39 | 0.004 | 0.0002 | 0.019 | 0.0063 | — | Comparative example steel |
| E | 0.126 | 1.33 | 2.82 | 0.007 | 0.0003 | 0.018 | 0.0095 | Ti: 0.025, B: 0.0019 | Example steel |
| F | 0.132 | 0.51 | 2.00 | 0.003 | 0.0011 | 0.005 | 0.0069 | Ti: 0.103, B: 0.0014 | Comparative example steel |

TABLE 1-continued

| Steel No. | Composition (mass %) | | | | | | | Note |
|---|---|---|---|---|---|---|---|---|
| | C | Si | Mn | P | S | sol. Al | N others | |
| G | 0.219 | 1.30 | 2.83 | 0.006 | 0.0020 | 0.018 | 0.0076 Ti: 0.015, B: 0.0018, Cu: 0.22, Ni: 0.05, Cr: 0.05, Mo: 0.04 | Example steel |
| H | 0.181 | 1.20 | 2.53 | 0.007 | 0.0004 | 0.004 | 0.0036 V: 0.009, Zr: 0.009, W: 0.008 | Example steel |
| I | 0.049 | 1.01 | 2.32 | 0.006 | 0.0013 | 0.005 | 0.0014 B: 0.0028, Nb: 0.013, V: 0.021 | Comparative example steel |
| J | 0.187 | 0.85 | 2.70 | 0.006 | 0.0011 | 0.006 | 0.0070 Ti: 0.009, B: 0.0045, Ca: 0.0007, Ce: 0.0005, La: 0.001 | Example steel |
| K | 0.194 | 1.92 | 2.56 | 0.008 | 0.0011 | 0.009 | 0.0034 B: 0.0028, Mg: 0.001, Sb: 0.01, Sn: 0.01 | Example steel |
| L | 0.206 | 2.70 | 3.57 | 0.003 | 0.0012 | 0.003 | 0.0034 Ti: 0.008, B: 0.0028, V: 0.013, Mg: 0.001 | Comparative example steel |

TABLE 2-1

| Steel No. | Steel No. | Annealing temperature (° C.) | Soaking time (s) | Annealing conditions | | | | | | | | | | | | Coating *10 | Note |
|---|---|---|---|---|---|---|---|---|---|---|---|---|---|---|---|---|---|
| | | | | CR1 *1 (° C./s) | CR2 *2 (° C./s) | Holding time *3 (sec) | CR3 *4 (° C./s) | CR4 *5 (° C./s) | CR5 *6 (° C./s) | Cooling stop temperature (° C.) | Holding time at cooling stop temperature (sec) | Heating rate *7 (° C./s) | Holding temperature (° C.) | Holding time *8 (sec) | CR6 *9 (° C./s) | | |
| 1 | A | 840 | 180 | 8 | 30 | 20 | 30 | 8 | 10 | 250 | 2 | 15 | 400 | 800 | 20 | — | Example |
| 2 | A | 805 | 180 | 8 | 30 | 20 | 30 | 8 | 10 | 250 | 2 | 15 | 400 | 800 | 20 | — | Comparative example |
| 3 | A | 850 | 180 | 0.5 | 30 | 20 | 30 | 8 | 10 | 250 | 2 | 15 | 400 | 800 | 20 | — | Comparative example |
| 4 | A | 850 | 180 | 8 | 2 | 20 | 30 | 8 | 10 | 250 | 2 | 15 | 400 | 800 | 20 | — | Comparative example |
| 5 | A | 850 | 180 | 8 | 30 | 2 | 30 | 8 | 10 | 250 | 2 | 15 | 400 | 800 | 20 | — | Comparative example |
| 6 | A | 850 | 180 | 8 | 30 | 7 | 30 | 8 | 10 | 250 | 2 | 15 | 400 | 800 | 20 | — | Example |
| 7 | A | 850 | 180 | 8 | 30 | 10 | 30 | 8 | 10 | 250 | 2 | 15 | 400 | 800 | 20 | — | Example |
| 8 | A | 850 | 180 | 8 | 30 | 14 | 30 | 8 | 10 | 250 | 2 | 15 | 400 | 800 | 20 | — | Example |
| 9 | A | 850 | 180 | 8 | 30 | 30 | 30 | 8 | 10 | 250 | 2 | 15 | 400 | 800 | 10 | — | Example |
| 10 | A | 850 | 180 | 8 | 30 | 60 | 30 | 8 | 7 | 250 | 2 | 15 | 365 | 1200 | 1 | — | Example |
| 11 | A | 850 | 180 | 8 | 30 | 500 | 30 | 8 | 10 | 250 | 2 | 15 | 400 | 800 | 20 | — | Comparative example |
| 12 | A | 850 | 180 | 7 | 30 | 20 | 2 | 8 | 10 | 250 | 2 | 15 | 400 | 800 | 20 | — | Comparative example |
| 13 | A | 850 | 180 | 8 | 30 | 20 | 30 | 20 | 1 | 250 | 30 | 15 | 400 | 800 | 20 | — | Comparative example |
| 14 | A | 850 | 180 | 8 | 30 | 20 | 30 | 14 | 10 | 250 | 2 | 15 | 400 | 800 | 20 | — | Example |
| 15 | A | 850 | 180 | 8 | 30 | 35 | 30 | 5 | 4 | 250 | 10 | 15 | 400 | 800 | 20 | — | Example |
| 16 | A | 850 | 180 | 8 | 20 | 35 | 30 | 0.5 | 2 | 250 | 20 | 15 | 400 | 800 | 20 | — | Example |
| 17 | A | 850 | 180 | 7 | 30 | 30 | 30 | 8 | 7 | 250 | 10 | 3 | 400 | 800 | 20 | — | Comparative example |
| 18 | A | 850 | 180 | 8 | 30 | 30 | 30 | 8 | 7 | 250 | 2 | 1 | 330 | 180 | 20 | — | Comparative example |
| 19 | A | 850 | 180 | 8 | 30 | 20 | 30 | 8 | 7 | 250 | 2 | 15 | 400 | 15 | 20 | — | Example |
| 20 | A | 850 | 180 | 8 | 30 | 20 | 30 | 8 | 6 | 250 | 2 | 15 | 400 | 60 | 20 | — | Example |
| 21 | A | 850 | 180 | 8 | 30 | 20 | 30 | 8 | 6 | 250 | 2 | 15 | 400 | 180 | 20 | — | Example |
| 22 | B | 870 | 180 | 8 | 30 | 20 | 30 | 8 | 8 | 250 | 2 | 15 | 400 | 800 | 20 | — | Comparative example |
| 23 | B | 870 | 180 | 30 | 50 | 20 | 30 | 15 | 8 | 250 | 2 | 15 | 400 | 800 | 50 | — | Comparative example |
| 24 | C | 850 | 180 | 50 | 50 | 35 | 16 | 8 | 10 | 230 | 2 | 5 | 400 | 180 | 20 | — | Example |
| 25 | C | 910 | 180 | 30 | 30 | 35 | 30 | 8 | 8 | 230 | 2 | 15 | 400 | 800 | 20 | — | Comparative example |
| 26 | D | 850 | 180 | 8 | 30 | 34 | 30 | 8 | 8 | 222 | 2 | 15 | 400 | 800 | 20 | — | Comparative example |
| 27 | E | 850 | 180 | 100 | 30 | 34 | 30 | 8 | 9 | 230 | 2 | 10 | 400 | 800 | 100 | — | Example |
| 28 | F | 850 | 180 | 8 | 30 | 35 | 29 | 7 | 10 | 250 | 2 | 15 | 530 | 800 | 20 | — | Comparative example |
| 29 | G | 850 | 180 | 8 | 100 | 35 | 30 | 8 | 10 | 225 | 2 | 15 | 400 | 800 | 20 | GA | Example |
| 30 | H | 850 | 180 | 6 | 30 | 180 | 30 | 8 | 10 | 235 | 2 | 15 | 400 | 800 | 20 | GI | Example |
| 31 | I | 850 | 180 | 8 | 32 | 35 | 30 | 8 | 8 | 250 | 2 | 15 | 400 | 800 | 20 | — | Comparative example |
| 32 | J | 850 | 180 | 8 | 30 | 34 | 30 | 8 | 14 | 235 | 2 | 30 | 400 | 2800 | 20 | EG | Example |
| 33 | K | 850 | 180 | 8 | 30 | 35 | 30 | 8 | 27 | 235 | 2 | 50 | 400 | 800 | 20 | — | Example |
| 34 | L | 850 | 180 | 7 | 30 | 35 | 29 | 7 | 10 | 230 | 2 | 15 | 400 | 800 | 20 | — | Comparative example |

*1: Average cooling rate in the temperature range of 810-700° C.
*2: Average cooing rate in the temperature range of 700-490° C.
*3: Holding time in the temperature range of 493-405° C.
*4: Average cooling rate in the temperature range of 405-310° C.
*5: Average cooling rate in the temperature range of 310-255° C.
*6: Average cooling rate in the temperature range of 255° C. to cooling stop temperature Tsq° C. Tsq: 220° C.-254° C.
*7: Average heating rate in the temperature range of cooling stop temperature to 350° C.
*8: Holding time in the temperature range of 350-550° C.
*9: Average cooling rate to a temperature of 350-50° C. or less
*10: GA: galvannealed steel sheet, GI: hot-dip galvanized steel sheet (without alloying treatment of zinc coating), EG: electrogalvanized steel sheet

TABLE 2-2

| No. | Steel No. | Area percentage of ferrite (%) | Area percentage of remainder*11 (%) | Volume percentage of retained γ (%) | Sγ_UB (%) | S_C concentration (%) | Nγ_LB (/100 μm²) | Sγ_FINE (%) | Sγ_BLOCK (%) | S_UB/Sγ_UB | TS (MPa) | EI (%) | L. EI (%) | λ (%) | TS × EI (MPa %) | Note |
|---|---|---|---|---|---|---|---|---|---|---|---|---|---|---|---|---|
| 1 | A | 2 | 98 | 9 | 0.6 | 0.5 | 55 | 2.0 | 2 | 5.0 | 1212 | 15.6 | 6.4 | 55 | 18907 | Example |
| 2 | A | 11 | 89 | 4 | 0.6 | 0.5 | 25 | 4.0 | 8 | 15.0 | 1263 | 13.0 | 5.0 | 38 | 16419 | Comparative example |
| 3 | A | 8 | 92 | 5 | 0.4 | 0.3 | 30 | 4.0 | 7 | 13.0 | 1242 | 13.4 | 5.4 | 42 | 16643 | Comparative example |
| 4 | A | 8 | 92 | 5 | 0.4 | 0.3 | 35 | 4.0 | 6 | 12.0 | 1244 | 13.4 | 5.2 | 46 | 16670 | Comparative example |
| 5 | A | 1 | 99 | 6 | 0.1 | 0.0 | 80 | 0.4 | 2 | 3.2 | 1228 | 13.4 | 6.3 | 60 | 16455 | Comparative example |
| 6 | A | 1 | 99 | 6 | 0.1 | 0.0 | 78 | 0.3 | 2 | 3.4 | 1223 | 13.4 | 6.1 | 57 | 16388 | Comparative example |
| 7 | A | 1 | 99 | 8 | 0.2 | 0.1 | 67 | 2.0 | 0 | 4.0 | 1215 | 14.1 | 6.0 | 57 | 17132 | Example |
| 8 | A | 1 | 99 | 10 | 0.5 | 0.4 | 62 | 2.0 | 1 | 4.0 | 1219 | 15.0 | 5.9 | 57 | 18285 | Example |
| 9 | A | 1 | 99 | 11 | 1.1 | 0.9 | 50 | 3.0 | 2 | 6.0 | 1224 | 16.7 | 5.8 | 56 | 20441 | Example |
| 10 | A | 1 | 99 | 11 | 1.0 | 0.8 | 37 | 4.0 | 3 | 8.0 | 1219 | 17.5 | 5.5 | 51 | 21333 | Example |
| 11 | A | 1 | 99 | 8 | 0.6 | 0.5 | 15 | 5.0 | 6 | 12.0 | 1210 | 15.8 | 5.3 | 44 | 19118 | Comparative example |
| 12 | A | 1 | 99 | 8 | 0.6 | 0.4 | 40 | 4.0 | 6 | 6.0 | 1208 | 14.5 | 5.2 | 46 | 17516 | Comparative example |
| 13 | A | 1 | 99 | 5 | 0.5 | 0.4 | 8 | 1.0 | 3 | 6.0 | 1239 | 13.6 | 5.2 | 48 | 16850 | Comparative example |
| 14 | A | 1 | 99 | 5 | 0.5 | 0.4 | 18 | 2.0 | 2 | 6.0 | 1229 | 14.4 | 5.4 | 51 | 17698 | Example |
| 15 | A | 1 | 99 | 12 | 0.8 | 0.8 | 64 | 2.0 | 0 | 6.0 | 1209 | 16.6 | 6.5 | 60 | 20069 | Example |
| 16 | A | 1 | 99 | 13 | 1.1 | 0.9 | 88 | 2.0 | 0 | 6.0 | 1217 | 16.8 | 7.5 | 67 | 20446 | Example |
| 17 | A | 1 | 99 | 5 | 0.3 | 0.2 | 72 | 0.4 | 0 | 5.0 | 1231 | 13.4 | 5.4 | 61 | 16495 | Comparative example |
| 18 | A | 1 | 99 | 3 | 0.1 | 0.0 | 133 | 0.2 | 0 | 3.2 | 1249 | 13.0 | 5.4 | 55 | 16237 | Comparative example |
| 19 | A | 1 | 99 | 3 | 0.1 | 0.0 | 98 | 2.0 | 3 | 3.3 | 1248 | 13.2 | 5.4 | 50 | 16474 | Comparative example |
| 20 | A | 1 | 99 | 5 | 0.3 | 0.1 | 82 | 2.0 | 2 | 3.5 | 1239 | 14.4 | 5.7 | 56 | 17842 | Example |
| 21 | A | 1 | 99 | 7 | 0.4 | 0.2 | 64 | 2.0 | 1 | 4.0 | 1224 | 15.6 | 6.0 | 56 | 19094 | Example |
| 22 | B | 14 | 86 | 7 | 0.1 | 0.1 | 24 | 2.0 | 8 | 12.0 | 1170 | 16.0 | 5.3 | 38 | 18720 | Comparative example |
| 23 | B | 3 | 97 | 7 | 2.8 | 2.5 | 8 | 0.4 | 6 | 6.0 | 1198 | 15.5 | 5.2 | 48 | 18569 | Comparative example |
| 24 | C | 5 | 95 | 8 | 1.0 | 0.7 | 53 | 3.0 | 3 | 13.0 | 1066 | 20.2 | 8.7 | 62 | 21531 | Example |
| 25 | C | 3 | 97 | 3 | 0.5 | 0.4 | 32 | 1.1 | 1 | 7.0 | 1110 | 14.1 | 5.2 | 53 | 15614 | Comparative example |
| 26 | D | 2 | 98 | 5 | 0.7 | 0.5 | 41 | 1.7 | 2 | 8.0 | 1511 | 8.7 | 3.2 | 18 | 13135 | Comparative example |
| 27 | E | 2 | 98 | 14 | 4.0 | 3.0 | 76 | 4.2 | 4 | 5.0 | 1046 | 19.1 | 7.0 | 59 | 19999 | Example |
| 28 | F | 2 | 98 | 7 | 0.9 | 0.6 | 123 | 0.6 | 5 | 6.0 | 1119 | 13.8 | 5.1 | 54 | 15389 | Comparative example |
| 29 | G | 2 | 98 | 10 | 1.2 | 0.8 | 60 | 4.1 | 3 | 8.0 | 1361 | 14.1 | 5.2 | 42 | 19144 | Example |
| 30 | H | 3 | 97 | 7 | 0.9 | 0.6 | 48 | 2.8 | 2 | 5.0 | 1254 | 16.4 | 6.0 | 51 | 20610 | Example |
| 31 | I | 1 | 99 | 2 | 0.1 | 0.0 | 8 | 0.2 | 1 | 22.0 | 565 | 15.8 | 5.8 | 33 | 8933 | Comparative example |
| 32 | J | 3 | 97 | 7 | 0.9 | 0.7 | 103 | 3.1 | 2 | 4.0 | 1262 | 15.5 | 5.7 | 57 | 19548 | Example |
| 33 | K | 2 | 98 | 10 | 1.2 | 0.8 | 30 | 4.8 | 2 | 6.0 | 1275 | 16.0 | 5.9 | 53 | 20358 | Example |
| 34 | L | 2 | 98 | 8 | 2.0 | 1.4 | 92 | 2.1 | 13 | 5.0 | 1325 | 13.4 | 4.9 | 26 | 17804 | Comparative example |

*11: Microstructure composed of one or two or more of upper bainite, fresh martensite, tempered martensite, lower bainite, and retained γ

Example 2

A cold-rolled steel sheet 1.2 mm in thickness with a composition listed in Table 1 was processed under the annealing conditions listed in Table 3-1 to produce steel sheets according to the disclosed embodiments and comparative examples. The measurement of the steel microstructure and the evaluation of the mechanical characteristics of the steel sheets were performed as described above. Table 3-2 shows the results. The area percentage of plate-like retained $\gamma_{UB}$ formed adjacent to upper bainite was determined as the area percentage $S_{\gamma_{UB}}$ of γ grains with a grain width in the range of 0.25 to 0.60 μm, a grain length in the range of 1.0 to 15 μm, and an aspect ratio in the range of 3.1 to 25.

The example Nos. 1, 2, 3, 4, 5, and 9 satisfy TS×El≥17000 MPa % and have a hole expandability (λ) of 50% or more in the 1180 MPa grade. By contrast, the comparative examples were inferior in at least one of the characteristics.

TABLE 3-1

| Steel No. | Steel No. | Annealing temperature (°C) | Soaking time (s) | CR1 *1 (°C./s) | CR2 *2 (°C./s) | Holding time *3 (sec) | CR3 *4 (°C./s) | CR4 *5 (°C./s) |
|---|---|---|---|---|---|---|---|---|
| 1 | A | 815 | 180 | 5 | 29 | 20 | 30 | 10 |
| 2 | A | 875 | 180 | 2 | 29 | 20 | 31 | 10 |
| 3 | A | 845 | 180 | 8 | 12 | 20 | 30 | 10 |
| 4 | A | 845 | 180 | 7 | 30 | 20 | 12 | 8 |
| 5 | A | 845 | 180 | 8 | 35 | 20 | 28 | 8 |
| 6 | A | 850 | 180 | 8 | 35 | 20 | 29 | 8 |
| 7 | A | 850 | 180 | 8 | 28 | 20 | 28 | 8 |
| 8 | A | 850 | 180 | 8 | 30 | 20 | 28 | 8 |
| 9 | C | 860 | 180 | 8 | 28 | 20 | 15 | 8 |
| 10 | D | 825 | 180 | 8 | 30 | 20 | 15 | 8 |

| No. | CR5 *6 (°C./s) | Cooling stop temperature (°C) | Holding time at cooling stop temperature (sec) | Heating rate *7 (°C./s) | Holding temperature (°C) | Holding time *8 (sec) | CR6 *9 (°C./s) | Note |
|---|---|---|---|---|---|---|---|---|
| 1 | 9 | 250 | 2 | 5 | 400 | 800 | 20 | Example |
| 2 | 9 | 250 | 2 | 10 | 400 | 800 | 20 | Example |
| 3 | 10 | 240 | 2 | 15 | 400 | 800 | 20 | Example |
| 4 | 10 | 240 | 2 | 25 | 400 | 800 | 20 | Example |
| 5 | 9 | 222 | 2 | 15 | 400 | 800 | 20 | Example |
| 6 | 10 | 200 | 2 | 15 | 400 | 800 | 20 | Comparative example |
| 7 | 8 | 230 | 2 | 15 | 600 | 800 | 20 | Comparative example |
| 8 | 5 | 230 | 2 | 15 | 400 | 3600 | 20 | Comparative example |
| 9 | 9 | 240 | 2 | 10 | 400 | 800 | 20 | Example |
| 10 | 9 | 240 | 2 | 10 | 400 | 800 | 20 | Comparative example |

*1: Average cooling rate in the temperature range of 810-700° C.
*2: Average cooling rate in the temperature range of 700-490° C.
*3: Holding time in the temperature range of 490-405° C.
*4: Average cooling rate in the temperature range of 405-310° C.
*5: Average cooling rate in the temperature range of 310-255° C.
*6: Average cooling rate in the temperature range of 255° C. to cooling stop temperature Tsq° C., Tsq: 220° C.-254° C.
*7: Average heating rate in the temperature range of cooling stop temperature to 350° C.
*8: Holding time in the temperature range of 350-550° C.
*9: Average cooling rate to a temperature of 350-50° C. or less

TABLE 3-2

| Steel No. | Steel No. | Area percentage of ferrite (%) | Area percentage of remainder *10 (%) | Volume percentage of retained γ (%) | $S\gamma_{UB}$ (%) | $S_C$ concentration (%) | $N\gamma_{LB}$ (/100 μm²) | $S\gamma_{FINE}$ (%) | $S\gamma_{BLOCK}$ (%) | $S_{UB}/S\gamma_{UB}$ | TS (MPa) | EI (%) | L. EI (%) | λ (%) | TS × EI (MPa %) | Note |
|---|---|---|---|---|---|---|---|---|---|---|---|---|---|---|---|---|
| 1 | A | 5 | 95 | 12 | 0.4 | 0.2 | 40 | 1.0 | 4 | 4.0 | 1182 | 17.0 | 6.0 | 52 | 20094 | Example |
| 2 | A | 4 | 96 | 11 | 1.3 | 0.5 | 62 | 2.0 | 2 | 5.0 | 1189 | 16.5 | 5.5 | 53 | 19619 | Example |
| 3 | A | 4 | 96 | 11 | 1.4 | 0.6 | 57 | 3.0 | 3 | 4.0 | 1185 | 16.8 | 5.4 | 57 | 19908 | Example |
| 4 | A | 3 | 97 | 10 | 0.9 | 0.4 | 55 | 2.0 | 3 | 6.0 | 1198 | 14.2 | 5.1 | 51 | 17012 | Example |
| 5 | A | 1 | 99 | 6 | 0.5 | 0.2 | 30 | 0.7 | 1 | 5.0 | 1278 | 14.4 | 5.3 | 60 | 18403 | Example |
| 6 | A | 1 | 99 | 3 | 0.1 | 0.0 | 21 | 0.2 | 3 | 4.0 | 1286 | 13.1 | 4.5 | 65 | 16847 | Comparative example |
| 7 | A | 1 | 99 | 7 | 0.4 | 0.2 | 88 | 3.0 | 7 | 5.0 | 1162 | 14.5 | 4.0 | 39 | 16849 | Comparative example |
| 8 | A | 1 | 99 | 6 | 0.2 | 0.1 | 70 | 2.0 | 8 | 6.0 | 1165 | 14.1 | 3.9 | 35 | 16427 | Comparative example |
| 9 | C | 3 | 97 | 10 | 1.2 | 0.8 | 65.0 | 3.0 | 3 | 5.0 | 1055 | 18.7 | 7.5 | 58 | 19729 | Example |
| 10 | D | 7 | 93 | 16 | 0.9 | 0.8 | 51.0 | 4.7 | 8 | 8.0 | 1411 | 9.1 | 2.9 | 22 | 12840 | Comparative example |

*10: Microstructure composed of one or two or more of upper bainite, fresh martensite, tempered martensite, lower bainite, and retained γ

INDUSTRIAL APPLICABILITY

The disclosed embodiments provide very high ductility and high stretch-flangeability and is preferably applicable to press forming used through a press forming process in automobiles, household electrical appliances, and the like.

The invention claimed is:
1. A steel sheet having a chemical composition comprising, by mass %:
C: 0.06% to 0.25%;
Si: 0.6% to 2.5%;
Mn: 2.3% to 3.5%;
P: 0.02% or less;
S: 0.01% or less;
sol. Al: less than 0.50%;
N: less than 0.015%; and
the balance being Fe and incidental impurities,
wherein the steel sheet has a steel microstructure comprising ferrite: 5% or less by area percentage, at least one of upper bainite, fresh martensite, tempered martensite, lower bainite, and retained γ: in a range of 95% to 100% by area percentage, and retained γ: in a range of 4% to 15% by volume percentage,
retained $\gamma_{UB}$ with a grain width in a range of 0.25 to 0.60 μm, a grain length in a range of 1.0 to 15 μm, and an aspect ratio in a range of 3.1 to 25 has an area percentage $S_{\gamma UB}$ in a range of 0.2% to 7.0%,
retained $\gamma_{LB}$ with a grain width in a range of 0.08 to 0.24 μm, a grain length in a range of 0.6 to 15 μm, and an aspect ratio in a range of 4 to 40 has a distribution number $N_{\gamma LB}$ in a range of 10 to 120 per 100 μm$^2$,
at least one of (i) fresh martensite with an equivalent circular grain diameter in a range of 0.4 to 1.0 μm and an aspect ratio of 3 or less and (ii) retained γ grains with an equivalent circular grain diameter in a range of 0.4 to 1.0 μm and an aspect ratio of 3 or less have a total area percentage $S_{\gamma Fine}$ in a range of 0.4% to 5.0%, and
at least one of (i) fresh martensite with an equivalent circular grain diameter in a range of 1.2 to 20 μm and an aspect ratio of 3 or less and (ii) retained γ grains with an equivalent circular grain diameter in a range of 1.2 to 20 μm and an aspect ratio of 3 or less have a total area percentage $S_{\gamma Block}$ in a range of 4% or less, including 0%.

2. The steel sheet according to claim 1, wherein
retained $\gamma_{UB}$ with a grain width in a range of 0.25 to 0.60 μm, a grain length in a range of 1.5 to 15 μm, and an aspect ratio in a range of 4 to 25 has an area percentage $S_{\gamma UB}$ in a range of 0.2% to 7.0%.

3. The steel sheet according to claim 1, wherein a ratio of an area percentage $S_{UB}$ of ferrite or upper bainite adjacent to the retained $\gamma_{UB}$ to the area percentage $S_{\gamma UB}$ satisfies $S_{UB}/S_{\gamma UB} \geq 3.5$.

4. The steel sheet according to claim 3, wherein a region with a C concentration in a range of 0.6% to 1.3% with an adjacent region having a C concentration of 0.07% or less in the microstructure has a total area percentage $S_{C\ concentration}$ in a range of 0.1% to 5%.

5. The steel sheet according to claim 3, wherein the chemical composition further comprises, by mass %, at least one Group selected from the group consisting of:
Group A: at least one selected from the group consisting of Ti: 0.002% to 0.1% and B: 0.0002% to 0.01%,
Group B: at least one selected from the group consisting of Cu: 0.005% to 1%, Ni: 0.01% to 1%, Cr: 0.01% to 1.0%, Mo: 0.01% to 0.5%, V: 0.003% to 0.5%, Nb: 0.002% to 0.1%, Zr: 0.005% to 0.2%, and W: 0.005% to 0.2%, and
Group C: at least one selected from the group consisting of Ca: 0.0002% to 0.0040%, Ce: 0.0002% to 0.0040%, La: 0.0002% to 0.0040%, Mg: 0.0002% to 0.0030%, Sb: 0.002% to 0.1%, and Sn: 0.002% to 0.1%.

6. The steel sheet according to claim 3, wherein the steel sheet has a tensile strength in a range of 780 to 1450 MPa.

7. The steel sheet according to claim 3, further comprising a galvanized layer disposed on a surface of the steel sheet.

8. The steel sheet according to claim 1, wherein a region with a C concentration in a range of 0.6% to 1.3% with an adjacent region having a C concentration of 0.07% or less in the microstructure has a total area percentage $S_{C\ concentration}$ in a range of 0.1% to 5%.

9. The steel sheet according to claim 8, wherein the chemical composition further comprises, by mass %, at least one Group selected from the group consisting of:
Group A: at least one selected from the group consisting of Ti: 0.002% to 0.1% and B: 0.0002% to 0.01%,
Group B: at least one selected from the group consisting of Cu: 0.005% to 1%, Ni: 0.01% to 1%, Cr: 0.01% to 1.0%, Mo: 0.01% to 0.5%, V: 0.003% to 0.5%, Nb: 0.002% to 0.1%, Zr: 0.005% to 0.2%, and W: 0.005% to 0.2%, and
Group C: at least one selected from the group consisting of Ca: 0.0002% to 0.0040%, Ce: 0.0002% to 0.0040%, La: 0.0002% to 0.0040%, Mg: 0.0002% to 0.0030%, Sb: 0.002% to 0.1%, and Sn: 0.002% to 0.1%.

10. The steel sheet according to claim 4, wherein the chemical composition further comprises, by mass %, at least one Group selected from the group consisting of:
Group A: at least one selected from the group consisting of Ti: 0.002% to 0.1% and B: 0.0002% to 0.01%,
Group B: at least one selected from the group consisting of Cu: 0.005% to 1%, Ni: 0.01% to 1%, Cr: 0.01% to 1.0%, Mo: 0.01% to 0.5%, V: 0.003% to 0.5%, Nb: 0.002% to 0.1%, Zr: 0.005% to 0.2%, and W: 0.005% to 0.2%, and
Group C: at least one selected from the group consisting of Ca: 0.0002% to 0.0040%, Ce: 0.0002% to 0.0040%, La: 0.0002% to 0.0040%, Mg: 0.0002% to 0.0030%, Sb: 0.002% to 0.1%, and Sn: 0.002% to 0.1%.

11. The steel sheet according to claim 8, wherein the steel sheet has a tensile strength in a range of 780 to 1450 MPa.

12. The steel sheet according to claim 8, further comprising a galvanized layer disposed on a surface of the steel sheet.

13. The steel sheet according to claim 1, wherein the chemical composition further comprises, by mass %, at least one Group selected from the group consisting of:
Group A: at least one selected from the group consisting of Ti: 0.002% to 0.1% and B: 0.0002% to 0.01%,
Group B: at least one selected from the group consisting of Cu: 0.005% to 1%, Ni: 0.01% to 1%, Cr: 0.01% to 1.0%, Mo: 0.01% to 0.5%, V: 0.003% to 0.5%, Nb: 0.002% to 0.1%, Zr: 0.005% to 0.2%, and W: 0.005% to 0.2%, and
Group C: at least one selected from the group consisting of Ca: 0.0002% to 0.0040%, Ce: 0.0002% to 0.0040%, La: 0.0002% to 0.0040%, Mg: 0.0002% to 0.0030%, Sb: 0.002% to 0.1%, and Sn: 0.002% to 0.1%.

14. The steel sheet according to claim 13, wherein the steel sheet has a tensile strength in a range of 780 to 1450 MPa.

15. The steel sheet according to claim 13, further comprising a galvanized layer disposed on a surface of the steel sheet.

16. The steel sheet according to claim 1, wherein the steel sheet has a tensile strength in a range of 780 to 1450 MPa.

17. The steel sheet according to claim 16, further comprising a galvanized layer disposed on a surface of the steel sheet.

18. The steel sheet according to claim 1, further comprising a galvanized layer disposed on a surface of the steel sheet.

19. A method for producing the steel sheet according to claim 1, the method comprising:
   hot rolling and cold rolling a steel slab with the chemical composition and annealing the cold-rolled steel sheet at an annealing temperature in a range of 810° C. to 900° C.;
   then cooling the steel sheet at an average cooling rate in a range of 1° C./s to 2000° C./s in a temperature range of 810° C. to 700° C. and cooling the steel sheet at an average cooling rate in a range of 10° C./s to 2000° C./s in a temperature range of 700° C. to 490° C.;
   holding the steel sheet in a temperature range of 490° C. to 405° C. for in a range of 10 to 200 seconds;
   cooling the steel sheet at an average cooling rate in a range of 10° C./s to 100° C./s in a temperature range of 405° C. to 310° C.;
   cooling the steel sheet at an average cooling rate in a range of 0.4° C./s or more and less than 20° C./s in a temperature range of 310° C. to 255° C.,
   cooling the steel sheet at an average cooling rate in a range of 2° C./s or more and less than 30° C./s in a temperature range of 255° C. to a cooling stop temperature Tsq in a range of 254° C. to 220° C.;
   heating the steel sheet at an average heating rate of 2° C./s or more in a temperature range of Tsq to 350° C., and holding the steel sheet at 350° C. to 550° C. for in a range of 20 to 3000 seconds; and
   cooling the steel sheet to a temperature in a range of 350° C. to 50° C. or less at an average cooling rate of 0.1° C./s or more.

20. A method for producing the steel sheet according to claim 8, the method comprising:
   hot rolling and cold rolling a steel slab with the chemical composition and annealing the cold-rolled steel sheet at an annealing temperature in a range of 810° C. to 900° C.;
   then cooling the steel sheet at an average cooling rate in a range of 1° C./s to 2000° C./s in a temperature range of 810° C. to 700° C. and cooling the steel sheet at an average cooling rate in a range of 10° C./s to 2000° C./s in a temperature range of 700° C. to 490° C.;
   holding the steel sheet in a temperature range of 490° C. to 405° C. for in a range of 10 to 200 seconds;
   cooling the steel sheet at an average cooling rate in a range of 10° C./s to 100° C./s in a temperature range of 405° C. to 310° C.;
   cooling the steel sheet at an average cooling rate in a range of 0.4° C./s or more and less than 20° C./s in a temperature range of 310° C. to 255° C.,
   cooling the steel sheet at an average cooling rate in a range of 2° C./s or more and less than 30° C./s in a temperature range of 255° C. to a cooling stop temperature Tsq in a range of 254° C. to 220° C.;
   heating the steel sheet at an average heating rate of 2° C./s or more in a temperature range of Tsq to 350° C., and holding the steel sheet at 350° C. to 550° C. for in a range of 20 to 3000 seconds; and
   cooling the steel sheet to a temperature in a range of 350° C. to 50° C. or less at an average cooling rate of 0.1° C./s or more.

\* \* \* \* \*